United States Patent
Zhu et al.

(10) Patent No.: US 6,815,132 B2
(45) Date of Patent: Nov. 9, 2004

(54) PHOTOCONDUCTOR MATERIALS BASED ON NEW PHASE OF TITANYL PHTHALOCYANINE

(75) Inventors: Jiayi Zhu, Woodbury, MN (US); Zbigniew Tokarski, Woodbury, MN (US); James A. Baker, Hudson, WI (US); Ronald J. Moudry, Woodbury, MN (US); David T. Ask, Somerset, WI (US); Nusrallah Jubran, St. Paul, MN (US); Kam W. Law, Woodbury, MN (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/328,697

(22) Filed: Dec. 24, 2002

(65) Prior Publication Data

US 2003/0235769 A1 Dec. 25, 2003

Related U.S. Application Data

(60) Provisional application No. 60/390,784, filed on Jun. 21, 2002.

(51) Int. Cl.[7] ................................................. G03G 5/06
(52) U.S. Cl. .................... 430/58.45; 430/59.5; 540/141
(58) Field of Search ............................ 430/58.45, 59.5, 430/58.55, 58.05, 58.35, 59.4, 124; 540/141; 399/162; 524/398

(56) References Cited

U.S. PATENT DOCUMENTS

| | | | |
|---|---|---|---|
| 4,898,799 A | 2/1990 | Fujimaki et al. | ............... 430/59 |
| 5,948,580 A | * 9/1999 | Nakamura et al. | ............ 430/83 |

FOREIGN PATENT DOCUMENTS

| | | | |
|---|---|---|---|
| JP | 43-16198 | 7/1968 | |
| JP | 47-21617 | 12/1972 | |
| JP | 54-79632 | 12/1977 | ............ G03G/5/06 |
| JP | 55-22834 | 8/1978 | .......... H05K/13/02 |
| JP | 56-116040 | 2/1980 | ............ G03G/5/06 |
| JP | 61-239248 | 4/1985 | ............ G03G/5/06 |

* cited by examiner

*Primary Examiner*—John L Goodrow
(74) *Attorney, Agent, or Firm*—Mark A. Litman & Associates, P.A.

(57) ABSTRACT

A crystalline phase of titanyl oxyphthalocyanine, referred to herein as the S-phase, has an internal blend of lattice arrangements is provided by treatment of the gamma-form of titanyl oxyphthalocyanine. The S-phase is a truly new phase, and not a mixture of particles of various phases (e.g., combinations of the beta-phase and the gamma-phase), with internal lattice distributions of atoms and molecules forming a new, non-continuous, non-uniform lattice structure. The x-ray spectrum shows a blend of diffraction peaks, having peaks that have previously been distinctly present only collectively among various crystalline forms of titanyl oxyphthalocyanine, but can now be provided in a single crystalline form. The visible spectra show significant absorption differences. The novel S-form titanyl oxyphthalocyanine is also used in a photoconductor displaying major peaks of Bragg's 2 theta angle to the CuK-alpha characteristic X-ray (wavelength 1.541 Angstrom) at least at 9.5±0.2 degrees, 9.7±0.2 degrees, 11.7±0.2 degrees, 13.5±0.2 degrees, (optionally at 21±0.2 degrees and/or 23.5±0.2 degrees,) 24.1±0.2 degrees, 26.4±0.2 degrees, and 27.3±0.2 degrees group. Additional peaks, approaching or equivalent to major peaks, may also be present as 15.0, 15.3 and 16.0±0.2 degrees.

29 Claims, 32 Drawing Sheets

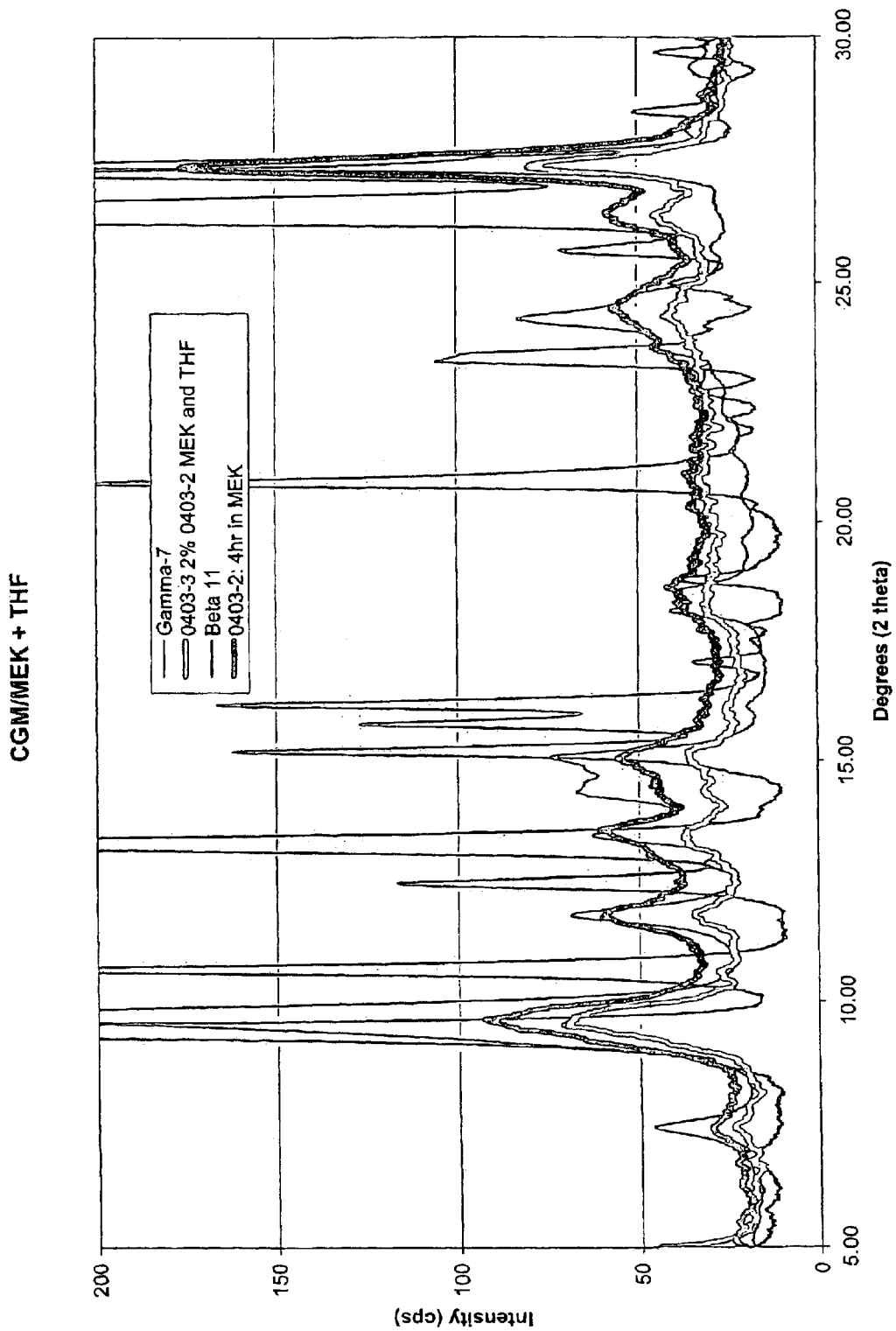

US 6,815,132 B2

PHOTOCONDUCTOR MATERIALS BASED ON NEW PHASE OF TITANYL PHTHALOCYANINE

This application claims the benefit of Provisional Application No. 60/390,784, filed Jun. 21, 2002.

BACKGROUND OF THE INVENTION

1. Field of the Invention

This invention relates to a photoreceptor for electrophotography and, specifically, a photoconductor having a new crystalline form of titanium phthalocyanine. The photoconductors are suitably used for any electrographic or electrophotographic process such as those used in printers, copying machines, etc. The photoconductors may have high sensitivity to long wavelength light and semiconductor laser beam rather than only to visible light.

2. Background of the Art

Electrophotographic photoreceptors having photosensitivity to visible light have been widely used for copying machines, printers, etc. The materials originally used as electrophotographic photoreceptors, usually inorganic photoreceptors, comprised a photosensitive layer (on a conductive support) comprising selenium, zinc oxide, cadmium sulfide, and other inorganic photoconductive substances as the main ingredients have been widely used. However, these inorganic photoreceptors were not always satisfactory with respect to photosensitivity, thermal stability, water/humidity stability, durability and other characteristics required in electrophotographic photoreceptors for copying machines and others. For instance, selenium is inclined to be crystallized by heat or stained by as fingerprints, which easily deteriorate the desired characteristics of the photoconductor. Electrophotographic photoreceptors using cadmium sulfide are inferior in water stability and durability and those using zinc oxide have a problem in durability, especially with regard to humidity and physical stress. Electrophotographic photoreceptors using selenium and cadmium sulfide also have disadvantageous restrictions in their manufacture and handling.

To improve upon and avoid such problems of inorganic photoconductive substances, various organic photoconductive substances have been used for photosensitive layers of electrophotographic photoreceptors. For instance, an organic photoreceptor using a photosensitive layer containing poly-N-vinyl carbazole and 2, 4, 7-trinitrofluorenone is disclosed in Japanese Unexamined Patent Publication No. 50-10496. This photoreceptor is, however, not sufficient with respect to sensitivity and durability. Therefore, an electrophotographic photoreceptor of the separated function type with two layers, a photosensitive layer composing a carrier generating layer and a carrier transporting layer independently, which respectively contain a carrier generating substance and carrier transporting substance, were developed. This enables different substances to assume the carrier generating function and carrier transporting function independently. Therefore, a wide range of substances can be selected that have one of the functions.

Thus, it is expected to obtain organic photoreceptors with high sensitivity and durability. Many carrier generating substances effective for the carrier generating layer of electrophotographic photoreceptors of the separate function type have been proposed. As an example of those using inorganic substances, amorphous selenium can be used as presented in the Gazette for the Japanese Unexamined Patent Publication No. 43-16198. This carrier generating layer containing the amorphous selenium is used in combination with a carrier transporting layer containing organic carrier transporting substance. However, the carrier generating layer comprising the amorphous selenium has the trouble of crystallization due to heat resulting in deterioration of the characteristics as described above. As an example using an organic substance as the carrier generating substance, there are organic dyes or pigments. For instances, those with a photosensitive layer containing bis-azo compounds represented in the Gazettes for Japanese Unexamined Patent Publication Nos. 47-37543, 55-22834, 54-79632, 56-116040, etc. have been already known.

However, though these bis-azo compounds represent relatively favorable sensitivity in the short and medium wavelength ranges, they are low in sensitivity in long wavelength range. It was difficult to use them in laser printers which use semiconductor laser beam sources and they require high reliability.

The gallium aluminum arsenide (Ga/Al/As) type light emitting element which is now widely used as semiconductor laser is more than 750 mm in oscillating wavelength. In order to obtain electrophotographic photoreceptors of high sensitivity for such long wave length light, many studies have been done. For instance, such a method was conceived as to add sensitizing agent to photosensitive materials such as Se, CdS and others with high sensitivity in the visible light range to make the wavelength longer. As described above, however, Se and CdS have not yet sufficient environmental resistance to temperature, humidity, etc. Also, a large number of organic type photoconductive materials have been known as described above; their sensitivity is limited to the visible light region below 700 nm usually and only a very small number of materials have enough sensitivity for longer wavelengths.

Among available charge generating materials, phthalocyanine type compounds are known to have photosensitivity (missing text) in the long wavelength region. Among them, alpha-type titanyl phthalocyanine is presented in the Gazzette for the Japanese Unexamined Patent Publication No. 61-239248. This type titanyl phthalocyanine has peaks in terms of Bragg's 2 theta angle when exposed to X-rays generated from a CuK-alpha source (wavelength 1.541 Angstroms) at 7.5, 12.3, 16.3, 25.3, and 28.7 degrees. However, its sensitivity is low and electric potential stability is inferior in repeated use and is susceptible to photographic fog in electrophotographic processes using reversal development. Electrification power is also low and a sufficient image density is hard to obtain.

U.S. Pat. No. 4,898,799 describes a photoreceptor containing a titanyl phthalocyanine with the major peaks of Bragg's 2theta angle to the CuK-alpha characteristic X-ray (wavelength 1.541 Angstroms) at least at 9.5±0.2 degrees, 9.7±0.2 degrees, 11.7±0.2 degrees, 15.0±0.2 degrees, 23.5±0.2 degrees, 24.1±0.2 degrees, and 27.3±0.2 degrees group. The production method of titanyl phthalocyanine was performed, for example, with titanium tetrachloride and phthalodinitrile mixed in alpha-chloronaphthalene solvent. The resulting dichloro titanium phthalocyanine ($TiCl_2Pc$) was hydrolyzed to obtain alpha-type titanyl phthalocyanine. This was processed by 2-ethoxyethanol, diglyme, dioxane, tetrahydrofuran, N,N-dimethyl formamide, N-methyl pyrrolidone, pyridine, morpholine, and other solvents which are electron donors.

SUMMARY OF THE INVENTION

A crystalline phase, referred to herein as the S-phase, comprising an internal blend of lattice arrangements is provided by treatment of a different form of the titanyl oxyphthalocyanine crystal (preferably starting with the gamma-form). The S-phase is a truly new phase (with spectral emission and absorption properties exhibited by a single crystal), and is not a mixture of distinct particles of various phases (e.g., combinations of particles of the beta-phase and the gamma-phase), with the internal lattice distributions in the S-phase of atoms and molecules forming a new, continuous, non-uniform lattice structure. The x-ray spectrum shows a blend of diffraction peaks, having peaks that have previously been distinctly present only collectively among various crystalline forms of titanyl phthalocyanine, but can now be provided in a single crystalline form.

This invention relates to a photoreceptor containing a titanyl phthalocyanine with the major peaks of Bragg's 2 theta angle to the CuK-alpha characteristic X-ray (wavelength 1.541 Angstrom) at least at 9.5±0.2 degrees, 9.7±0.2 degrees, 11.7±0.2 degrees, 13.5±0.2 degrees, 24.1±0.2 degrees, 26.4±0.2 degrees, and 27.3±0.2 degrees. Additional peaks, approaching or equivalent to major peaks may also be present as 15.0, 15.3 and 16.0±0.2 degrees. Other features that may be present, but are not necessarily specific identifiers of the S-form could be a beta-form peak at 21.0±0.2 degrees, and a shoulder at 23–23.5±0.2 degrees.

BRIEF DESCRIPTION OF DRAWINGS

The drawings illustrate aspects of this invention, in which:

FIG. 5 shows X-ray diffraction spectrum of four samples of titanyl oxyphthalocyanine, two milled with different solvents.

DETAILED DESCRIPTION OF THE INVENTION

Figure 1:
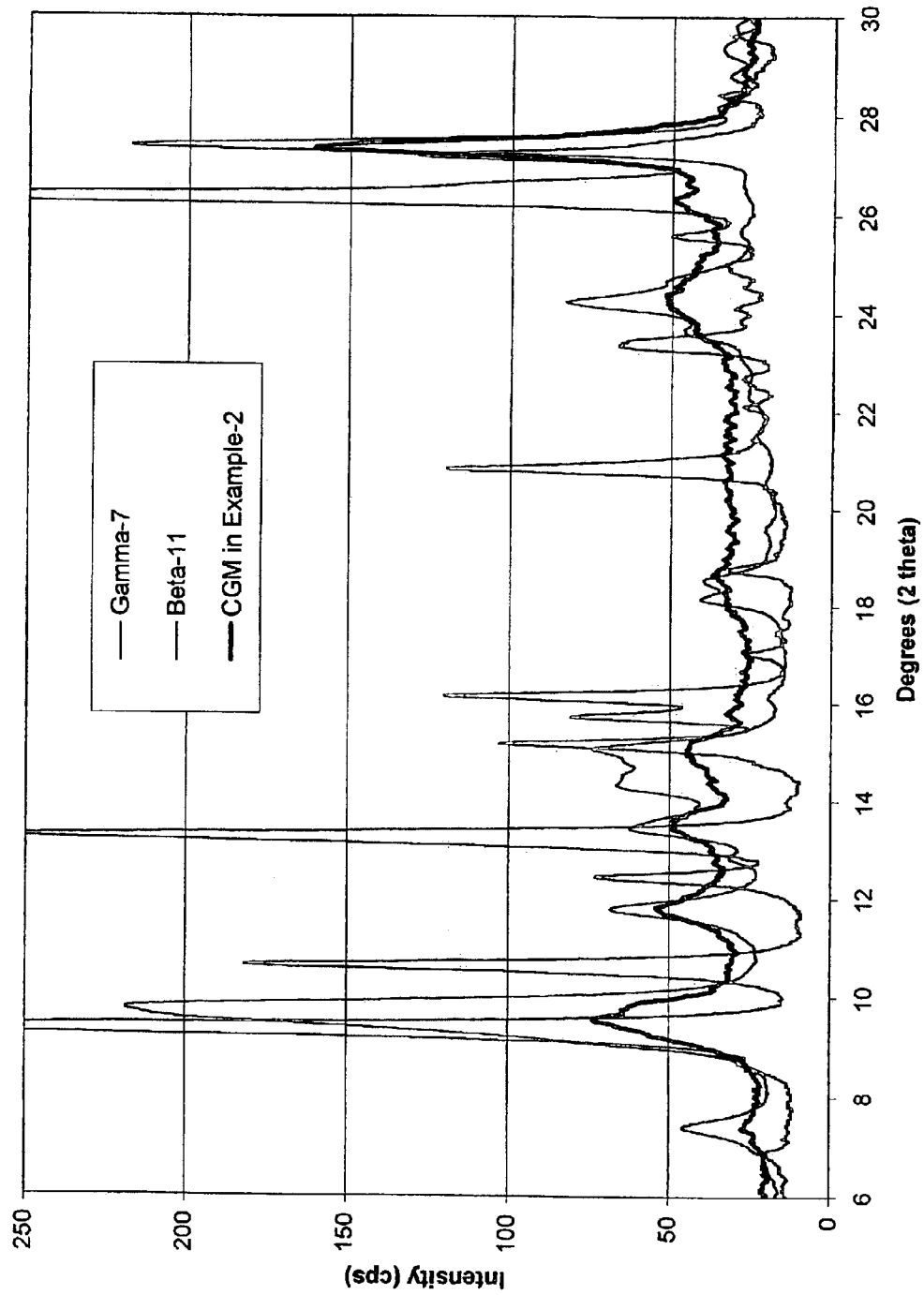
FIG. 1 shows X-ray diffraction of four samples of titanyl oxyphthalocyanine (TiOPc), Gamma-7 (commercially available), Beta-11 (commercially available), and two samples milled in MEK.

Titanyl oxyphthalocyanine according to this invention is used as a carrier generating substance when used as an electrophotographic photoreceptor of the separate function type. It composes a photoreceptor in combination with a carrier transporting substance. The titanyl oxyphthalocyanine according to this invention is different one from the many individual types of titanyl oxyphthalocyanine described above and in the prior art. The present crystalline form of titanyl oxyphthalocyanine has X-ray diffraction spectrum with a unique combination of major peaks. These major peaks sharply project from noises of the Bragg angle to the X-ray beam of 2 theta angle to the CuK-alpha characteristic X-ray (wavelength 1.541 Angstrom) at least at 9.5±0.2 degrees, 9.7±0.2 degrees, 11.7±0.2 degrees, 13.5±0.2 degrees, 21±0.2 degrees, 23.5±0.2 degrees, 24.1±0.2 degrees, 26.4±0.2 degrees, and 27.3±0.2 degrees group. Additional peaks, approaching or equivalent to major peaks may also be present as 15.0, 15.3, and 16.0±0.2 degrees as described above. The titanium oxyphthalocyanine according to this invention has a distinctly different crystal form from that of the crystalline types previously noted in the literature, comprising an internal, continuous/non-uniform blend of different lattice structures.

This invention also relates to a photoreceptor containing a titanyl phthalocyanine with the major peaks of Bragg's 2 theta angle to the CuK-alpha characteristic X-ray (wavelength 1.541 Angstrom) at least at 9.5±0.2 degrees, 9.7±0.2 degrees, 11.7±0.2 degrees, 13.5±0.2 degrees, 24.1±0.2 degrees, 26.4±0.2 degrees, and 27.3±0.2 degrees. Additional peaks, approaching or equivalent to major peaks may also be present as 15.0, 15.3 and 16.0±0.2 degrees. Other features that may be present, but are not necessarily specific identifiers of the S-form could be a beta-form peak at 21.0±0.2 degrees, and a shoulder at 23–23.5±0.2 degrees.

Titanyl oxyphthalocyanine according to this invention (referred to herein as the "S-form") presents a special spectrum which has not been seen in a single crystal before as described above.

The above X-ray diffraction spectra were measured under the conditions below (same hereafter).
X-ray tube bulb: Cu
Voltage: 40.0 KV
Current: 100.0 mA
Start angle: 6.00 deg.
Stop angle: 35.00 deg.
Step angle: 0.020 deg.
Measuring time: 0.50 sec.

It has been recognized in the past that milling conditions, solvents used, temperatures used, additional additives, and the type of milling used have an unpredictable effect upon the resulting crystalline phase or form structure resulting from the milling. However, there is no basis for predicting in advance of the actual use of new combinations of parameters precisely what the resulting crystalline form (and its attendant x-ray diffraction pattern) will be. There has been no basis for being able to predict whether any specific set of parameters (in the absence of their actually having been tried) will produce any one of the specific forms available in the numerous forms that appear to be available with titanyl oxyphthalocyanines. U.S. Pat. No. 4,898,799 established that the presence of a single new peak or the absence of a previous peak was clear evidence that different lattice structure and a different crystalline form were present in the product. Even a single major peak difference (by way of presence or absence) is conclusive evidence of different overall lattice structure. The term "major peak" should not be a subjective term, but its utilization in the art to distinguish between materials has rendered the term somewhat subjective if not ambiguous. The term should be considered in light of both absolute and relative intensities generated from x-ray diffraction tests at a constant x-ray intensity, but at the varying angles. For example, the major peaks should have an intensity of at least 50 (cps) or at least 70, or at least 100, when the peak intensity for any peak is above 200 (cps) or the peak intensity for any peak is above 250 (cps). This can be seen by comparing the various peaks within data plots. For example, it would be marginal at best to call the data structure at 7.5 degrees a major peak, while the structures at 11.8 and 24.2 should be termed major peaks, while the structures at 26.4, 21.0, 15.5 and 9.5 must be called major peaks.

Attached are data for beta, gamma, and S-form of TiOPc. Our belief is that S-form crystals in s-TiOPc are different from the crystals of beta-form or gamma-form. The S-form crystals are not a mixture of individual beta crystals and individual gamma crystal phases. However, the S-form crystals have both beta and gamma characteristics and display a collection of major peaks from both forms, without displaying only those peaks within a single previously recognized form. Therefore, the x-ray peaks of the S-form appear in the composite of similar positions as the gamma and beta peaks. However, the S-form is also a generic form. It has many species. Each has a unique ratio of beta and gamma characteristics (both in properties, spectra, and presumably crystalline lattice structure), depending on the degree and direction of transformation.

The process described and provided in the Examples explains why the S-form has both beta and gamma spectra characteristics. The gamma-form is not a stable form of TiOPc. Therefore, it can be converted to another form, and in the specific examples shown, to the S-form easily during milling in a number of defined conditions. The S-form is also not a stable form relative to the beta-form. It can also be converted to beta form if the condition is right. In our belief, the phase transformation process is gamma>S>beta. The atomic arrangement in gamma crystals is in a particular (gamma) pattern whereas the atomic arrangement in the beta crystals is in another particular (beta) pattern. When a gamma crystal start transforming to S-form, part of gamma pattern becomes beta pattern. Both the gamma and beta pattern co-exist in the same crystal. Only when 100% of the gamma pattern transforms into beta pattern, a beta form crystal is formed. When the transformation is less than 100%, only an S-form is obtained. It must be noted that this transformation is within the lattice structure, and is not particle-by-particle gross transformation. Lattice by lattice is translated from one form to the other, passing through the intermediate S-form stage where the crystal structure is neither beta-form nor gamma-form.

The attached plot 1, FIG. 1 shows the x-ray diffraction of gamma-form (from supplier) and beta-form (from supplier) form crystals, and an S-form (from milling of gamma form, according to Example 2).

Figure 2:
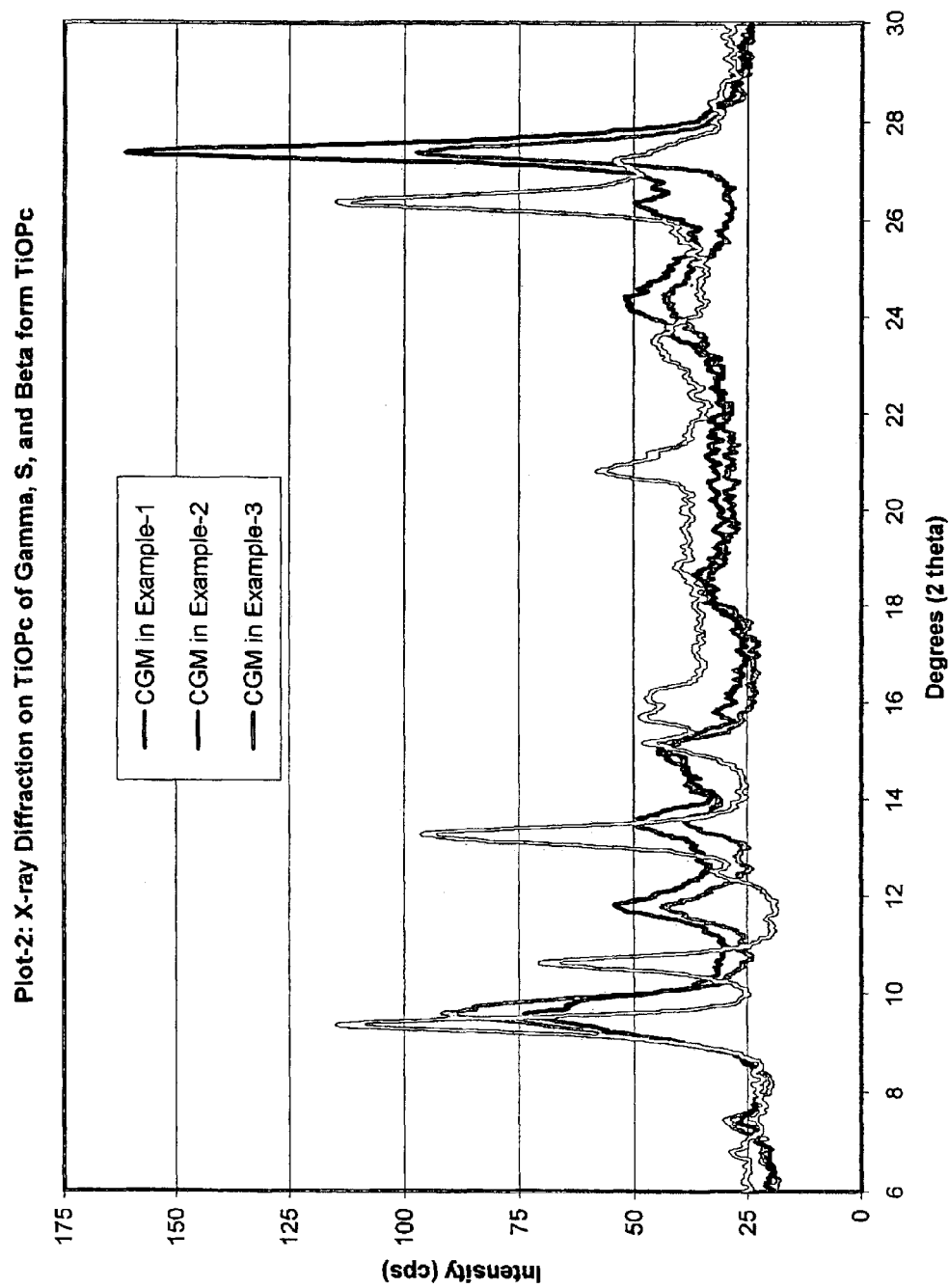
FIG. 2 shows the X-ray diffraction spectrum of four samples of titanyl oxyphthalocyanine, two beta-forms and two gamma-forms, with data shown in Table 1. (Note: Gamma 7 and gamma 8 are the same except different lot #).
Figure 3:
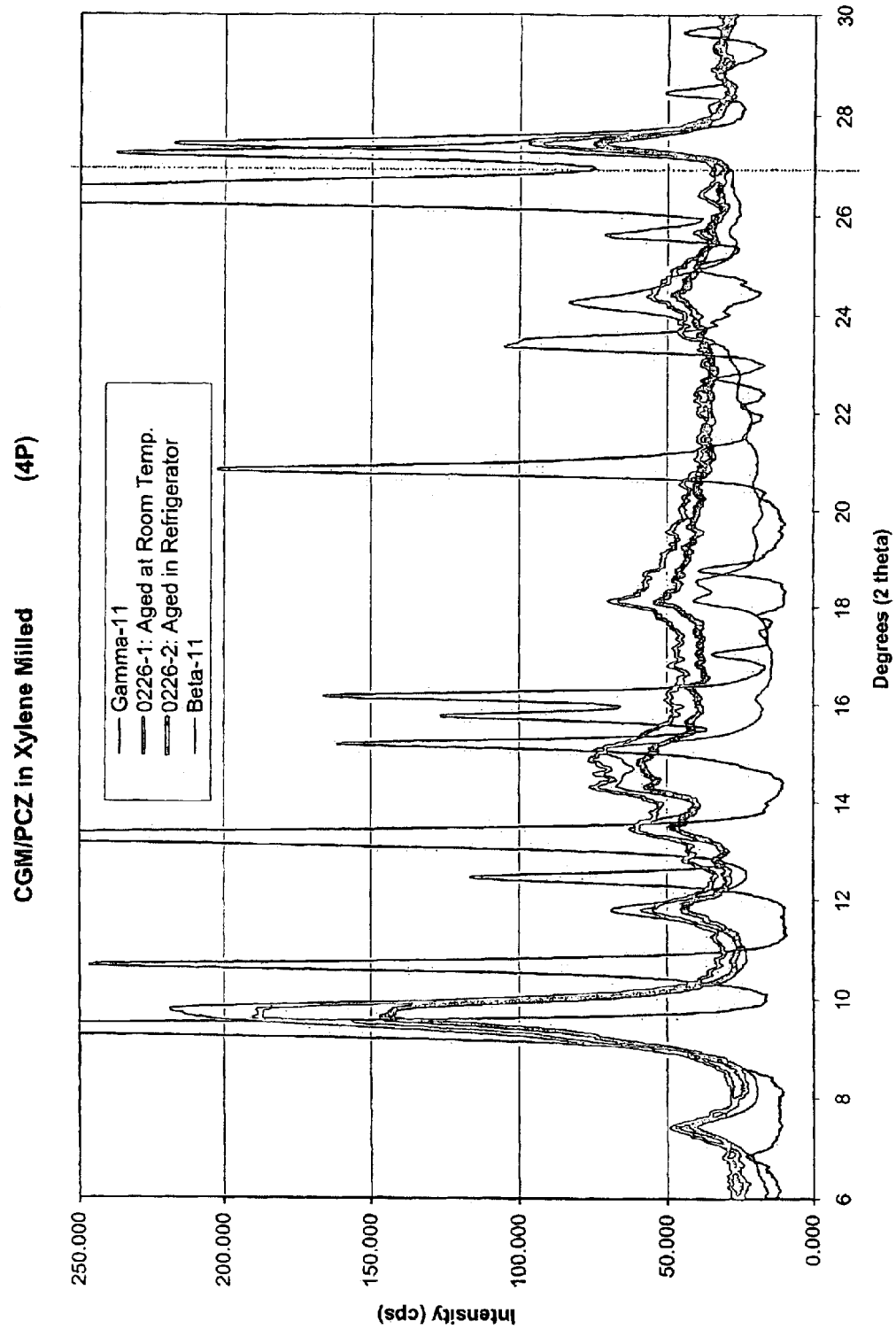
FIG. 3 shows an X-ray diffraction spectrum of four samples of titanyl oxyphthalocyanine (TiOPc), two of which have been aged, with data shown in Table 4.
Figure 4:
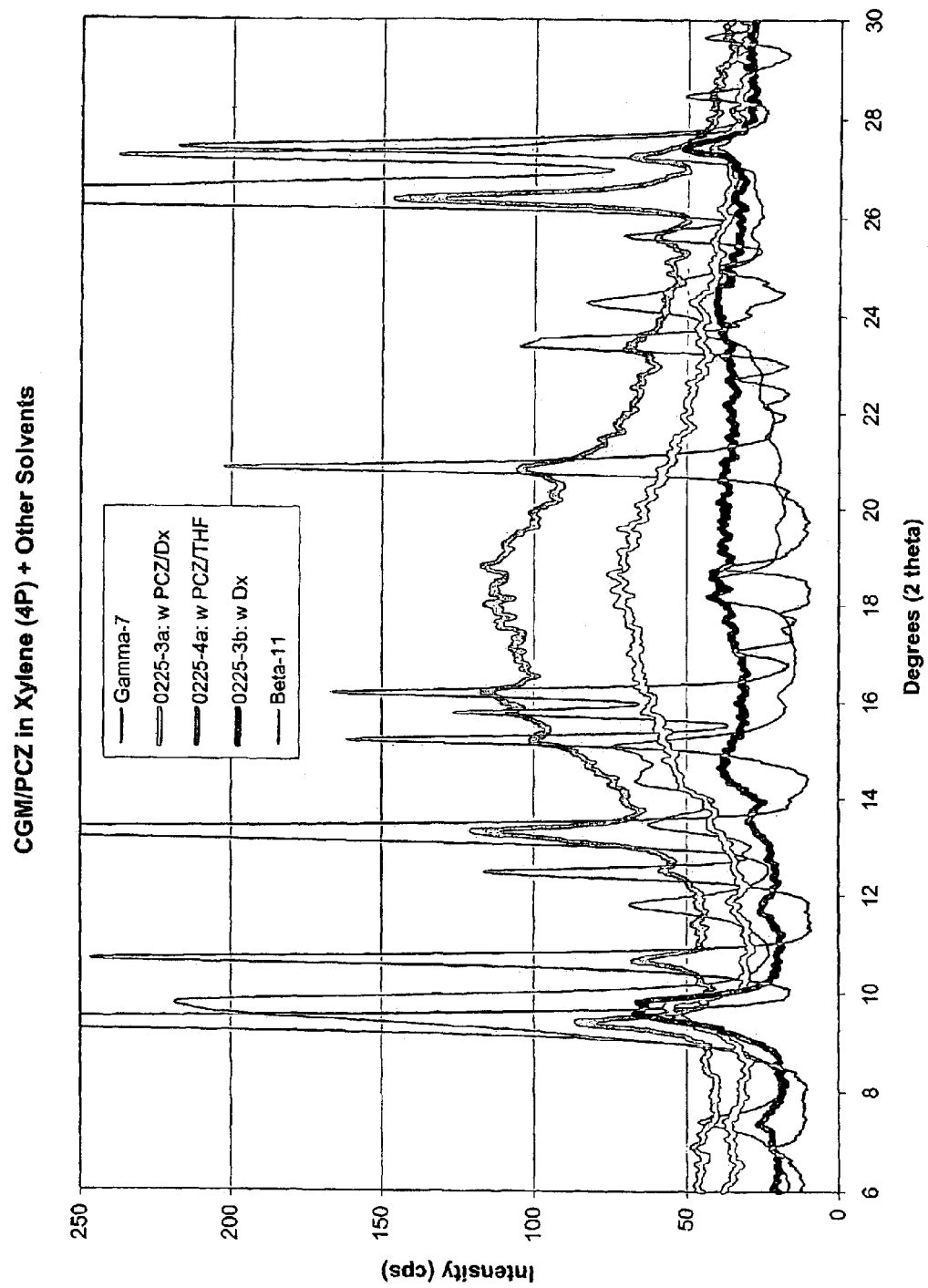
FIG. 4 shows the X-ray diffraction spectrum of five samples of titanyl oxyphthalocyanine three of which have been milled with different solvents and the data shown in Table 3.

The attached plot 2 in FIG. 2 shows the x-ray diffraction of examples of a commercial gamma form (Gamma-7), a commercial Beta-form (Beta-11), the Gamma 11 milled for 1 hour in Xylene and then refrigerated (no significant S-form at this point), and then after Gamma-11 has been milled for 3.5 hours in xylene then refrigerated, with S-form definitely present at this stage.

Table 5 tabulates the X-ray peaks of Examples 1–3. It also provides the peak area of each peak.

Table 6 is the electrostatic data of Examples 1–3. Please notice the performance of Example 2 is arguably better than both beta-form and gamma-form with regard to the S-forms ability to hold a higher charge and then discharge to a lower level.

Figure 30:
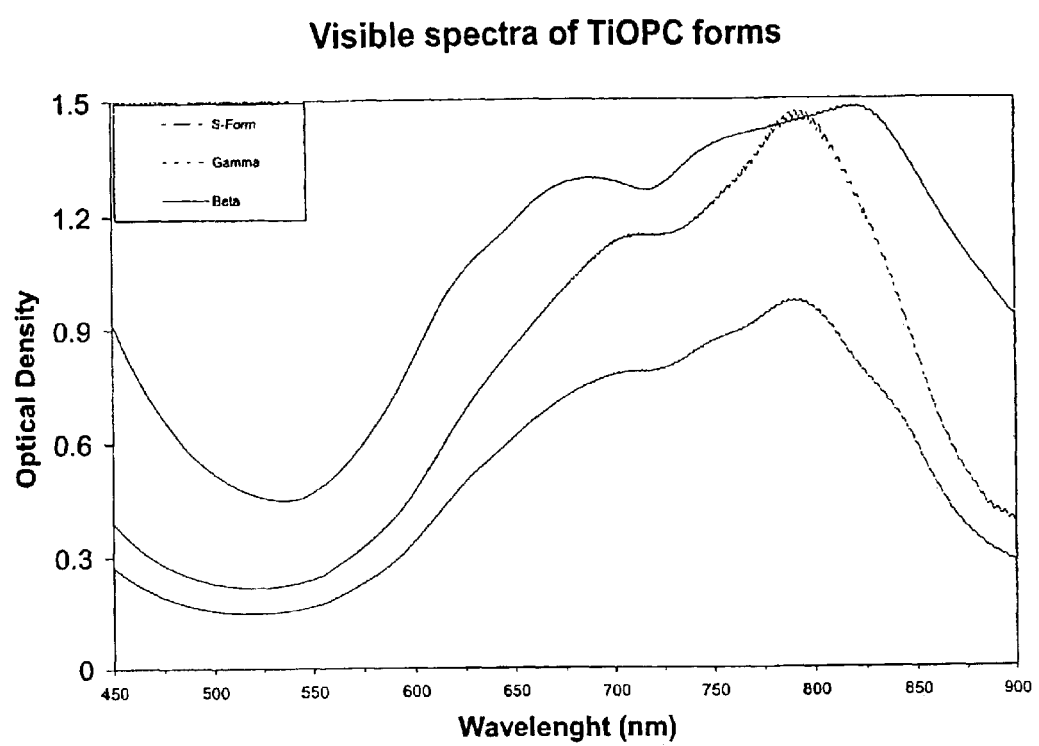
FIG. 30 shows Visible Spectra of TiOPc forms, specifically Beta-form, Gamma-form, and S-form Titanyl Oxyphthalocyanine forms.

FIG. 30 shows Visible Spectra of Beta, Gamma and S-form Titanyl Oxyphthalocyanine crystal. It is to be noted that the visible spectra, as with the x-ray diffraction spectra, shows significant differences. The beta form shows higher absorption above 850 nanometers as compared to both the S-form and the Gamma form. The S-form shows much lower absorption at 790–800 nm than the gamma-form and the beta-form, even after correction of any base-line differences that might be implied. In view of the substantively identical chemical composition of the three forms, the difference in visible spectra is again supportive of the different crystal and lattice structure among the three forms.

It is desirable to use the titanyl oxyphthalocyanine obtained as described above in a dry condition but it may be used in the form of wet paste. For the dispersive medium to be used for agitating and milling, those which are usually used for dispersion or emulsifying pigments, etc. such as glass beads, steel beads, alumina beads, flint stone, etc. can be cited. However, a dispersive medium is not always required. As an auxiliary agent for frictional crushing, those used as auxiliary agents for frictional crushing of pigments such as common salt, sodium bicarbonate, Glauher's salt, etc. can be cited. However, an auxiliary agent for frictional crushing is not always necessary.

When solvent is required for agitating, milling, or frictional crushing, those which are liquefied at the temperature at the time of agitating or milling may be used. For instance, the prior art (e.g., U.S. Pat. No. 4,898,799) had indicated that it was desirable to select more than one of the solvents such as alcohol type solvent (such as glycerol, ethylene glycol, diethylene glycol) or polyethylene glycol type solvent, ethylene glycol monomethyl ether, ethylene glycol monoethyl ether, and other cellosoluble type solvents, ketone type solvents, esterketone type solvents, etc. It has been found in the practice of the present invention that milling in methyl-ethylketone (THF produces beta form when milled, but we can add THF in CGM in ethyl acetate millbase to produce S-form) enables formation of the S-form, while other solvents have not been tested under conditions where that specific transition is controllable and sufficiently stable. Representative equipment used for the crystal inversion processes are general agitating equipment such as homo-mixer, disperser, agitator, stirrer, kneader, Banbury mixer, ball mill, sand mill, attritor, sonic mixers, etc. Temperature range for crystal inversion processes is 30–180° C., desirably 40 degree–130° C. As in usual crystal inversion processes, using a crystalline germ is also effective.

In this invention, other carrier generating substances may be used jointly with the above described titanyl oxyphthalocyanine. Carrier generating substances which may be used jointly with titanyl oxyphthalocyanine are, for example, alpha-type, beta-type, gamma-type, x-type, tau-type, tau'-type, and eta-type and eta'-type titanyl or non-metallic oxyphthalocyanine. In addition to the above ones, oxyphthalocyanine pigment, azo pigments, anthraquinone pigments, parylene pigments, polycyclic quinone pigments, squaric acid methine pigments, merocyanine pigments, cyanine pigments, etc. can be provided.

In the photoreceptors according to this invention, oxazole derivative, oxadiazole derivative, thiazole derivative, imidazole derivative, imidazolone derivative, imidazolizine derivative, bisimidazolizine derivative, styryl compound, hydrazone compound, pyrazolone derivative, oxazolone derivative, benzothiazole derivative, benzoimidazole derivative, quinazoline derivative, benzofuran derivative, acridine derivative, phenazine derivative, amino stilbene derivative, poly-N-vinyl carbazole, poly-1-vinyl pylene, poly-9-vinyl anthracene, etc. can be used as carrier transporting substances used when separated function type photoreceptors are adopted.

Generally in photoreceptors, a carrier transporting substance effective with a certain carrier generating substance is not always effective with other carrier generating substances. Also a carrier generating substance effective with a certain carrier transporting substance is not always effective with other carriers. In order to use them as electrophotographic photoreceptors, the correct combination of a carrier generating substance and carrier transporting substance is necessary. An improper combination reduces sensitivity of the electrophotographic photoreceptor and especially due to the insufficient discharge efficiency in a low electric field, the rest potential increase. In the worst case, for instance when such an electrophotographic photoreceptor is used for a duplicating machine, an electrical charge is accumulated while it is used repeatedly, and the toner sticks to areas other than the image, staining the base of the copy or damaging the clear duplicated image.

Electron transport materials include, but are not limited to those well known electron transport materials such as bromoanil, tetracyanoethylene, tetracyanoquinodimethane, 2,4,7-trinitro-9-fluorenone, 2,4,5,7-tetranitro-9-fluorenone, 2,4,5,7-tetranitroxanthone, 2,4,8-trinitrothioxanthone, 2,6,8-trinitro-indeno4H-indeno[1,2-b]thiophene-4-one, and 1,3,7-trinitrodibenzothiophene-5,5-dioxide, (2,3-diphenyl-1-indenylidene)malononitrile, 4H-thiopyran-1,1-dioxide and its derivatives such as 4-dicyanomethylene-2,6-diphenyl-4H-thiopyran-1,1-dioxide, 4-dicyanomethylene-2,6-di-m-tolyl-4H-thiopyran-1,1-dioxide, and unsymmetrically substituted 2,6-diaryl-4H-thiopyran-1,1-dioxide such as 4H-1,1-dioxo-2-(p-isopropylphenyl)-6-phenyl-4-(dicyanomethyl-idene)thiopyran and 4H-1,1-dioxo-2-(p-isopropylphenyl)-6-(2-thienyl)-4-(dicyanomethyl-idene)thiopyran, derivatives of phospha-2,5-cyclohexadiene, alkoxycarbonyl-9-fluorenylidene)malononitrile derivatives such as (4-n-butoxycarbonyl-9-fluorenylidene)malononitrile, (4-phenethoxycarbonyl-9-fluorenylidene)malononitrile, (4-carbitoxy-9-fluorenylidene)malononitrile, and diethyl(4-n-butoxycarbonyl-2,7-dinitro-9-fluorenylidene)-malonate, anthraquinodimethane derivatives such as 11,11,12,12-tetracyano-2-alkylanthraquinodimethane and 11,11-dicyano-12,12-bis(ethoxycarbonyl)anthraquinodimethane, anthrone derivatives such as 1-chloro-10-[bis(ethoxycarbonyl)methylene]anthrone, 1,8-dichloro-10-[bis(ethoxycarbonyl)methylene]anthrone, 1,8-dihydroxy-10-[bis(ethoxycarbonyl)methylene]anthrone, and 1-cyano-10-bis(ethoxycarbonyl)methylene)anthrone, 7-nitro-2-aza-9-fluoroenylidene-malononitrile, diphenoquinone derivatives, benzoquinone derivatives, naphthoquinone derivatives, quinine derivatives, tetracyanoethylenecyanoethylene, 2,4,8-trinitrothioxantone, dinitrobenzene derivatives, dinitroanthracene derivatives, dinitroacridine derivatives, nitroanthraquinone derivatives, dinitroanthraquinone derivatives, succinic anhydride, maleic anhydride, dibromo maleic anhydride, pyrene derivatives, carbazole derivatives, hydrazone derivatives, N,N-dialkylaniline derivatives, diphenylamine derivatives, triphenylamine derivatives, triphenylmethane derivatives, tetracyanoquinonedimethane, 2,4,5,7-tetranitro-9-fluorenone, 2,4,7-trinitro-9-dicyanomethylenene-fluorenone, 2,4,5,7-tetranitroxanthone derivatives, and 2,4,8-trinitrothioxanthone derivatives.

Thus, combining a carrier generating substance and carrier transporting substance is important. However, there are no specific general (absolute) rules for selecting such combinations. Finding any carrier transporting substance suitable to a specific carrier generating substance is difficult. In addition, the charge transfer substances according to this invention are safe, favorable in terms of the environment, and they are chemically stable.

As described above, this invention can provide photoreceptors with high sensitivity to long wavelength light, high in electric potential stability when used repeatedly, high in charging ability, and core optimum for reversal development processes.

In the photosensitive layer comprising the photoreceptor, it is desirable that particle carrier generating substance and carrier transporting substance are combined by binder substance (that is, dispersed in the layer in the form of pigment). In such a case, printing resistance, durability, and other characters of the layer are improved, memory phenomenon is decreased, and rest potential becomes stable.

A photosensitive layer of the photoreceptor according to this invention may be composed by providing a layer with the said carrier generating substances dispersed in the binder on an electric conductive support. Or the so-called separate function type photosensitive layer of the laminated layer type or dispersion type may be provided by combining this carrier generating substance and carrier transporting substance.

Figure 6A:
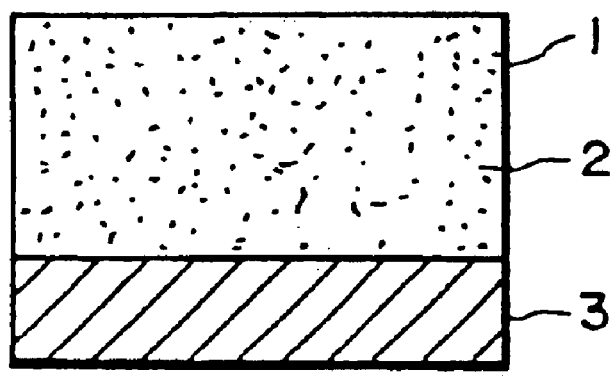
FIGS. 6a and 6b show cross-sections of electrophotographic structures.
Figure 6B:
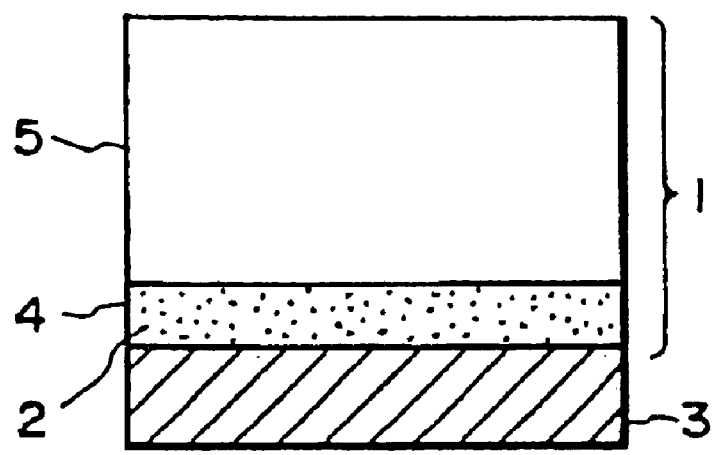
Figure 7:
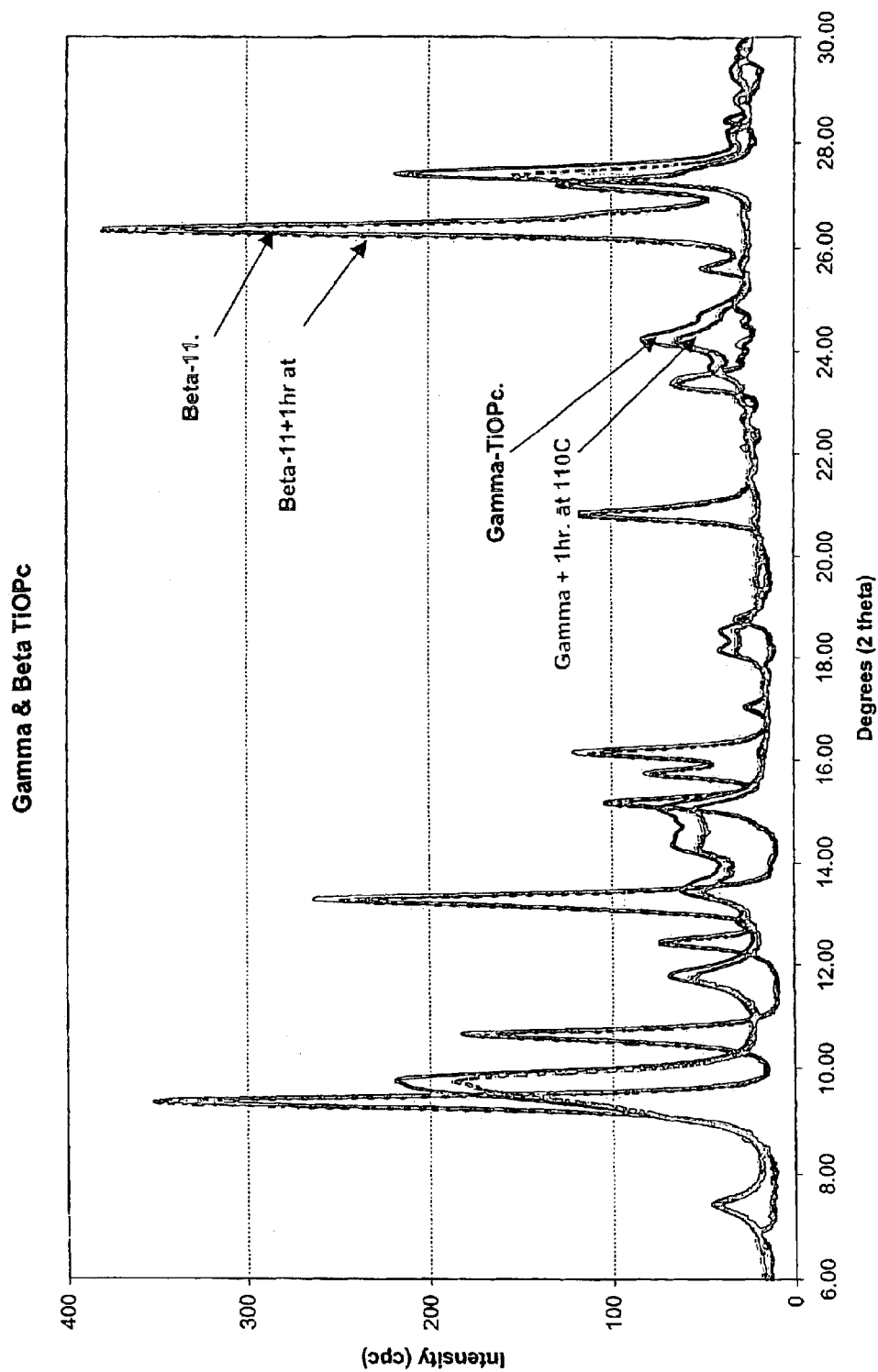
FIG. 7 shows X-ray diffraction data of two sets of Beta-11 and Gamma forms of TiOPc, with and without aging for 1 hour at 110° C.
Figure 8:
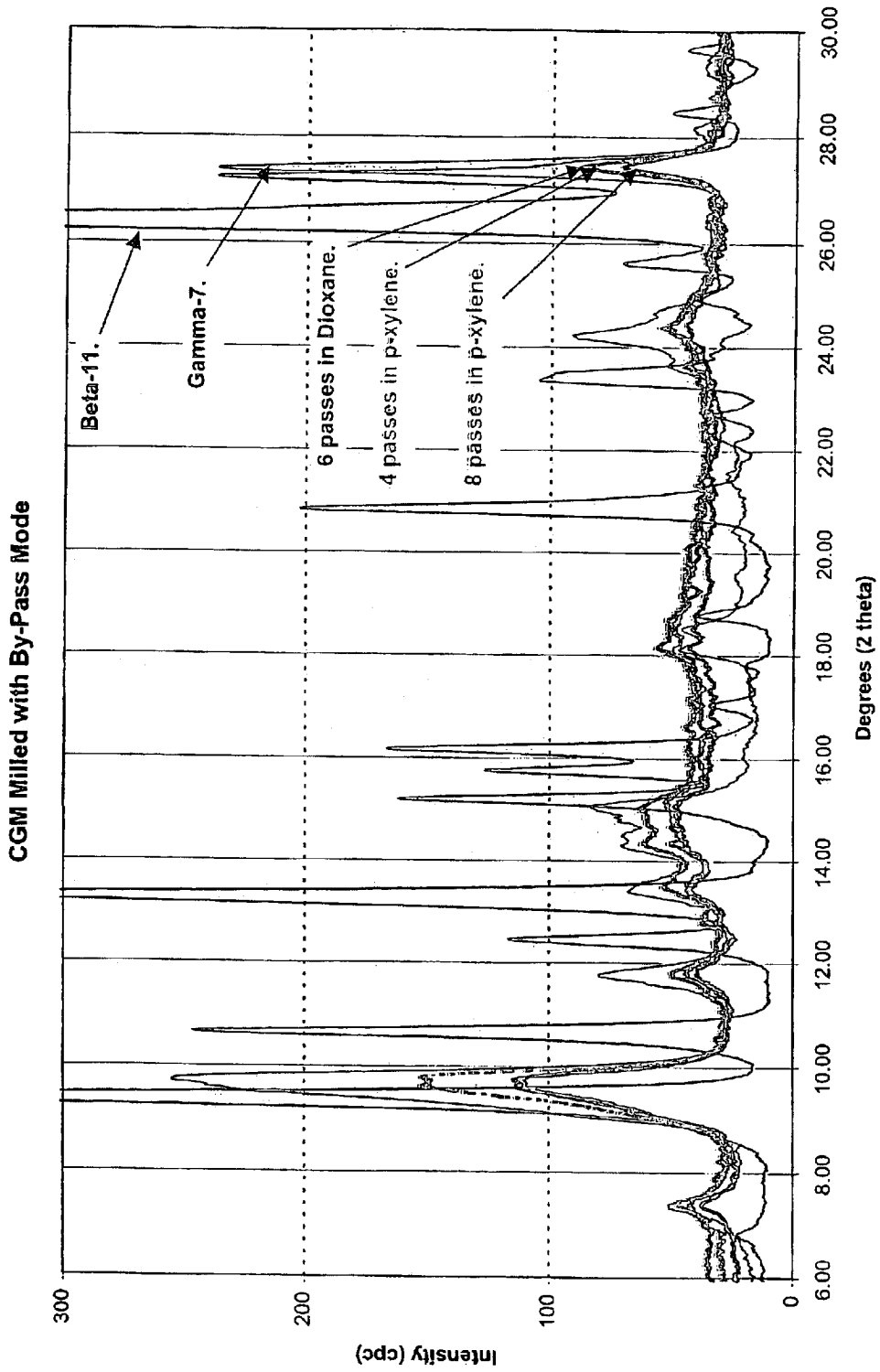
FIG. 8 shows X-ray diffraction spectrum of five samples of titanyl oxyphthalocyanine, three of which had been milled with different solvents and different numbers of passes, with the data shown in Table 4.
Figure 9:
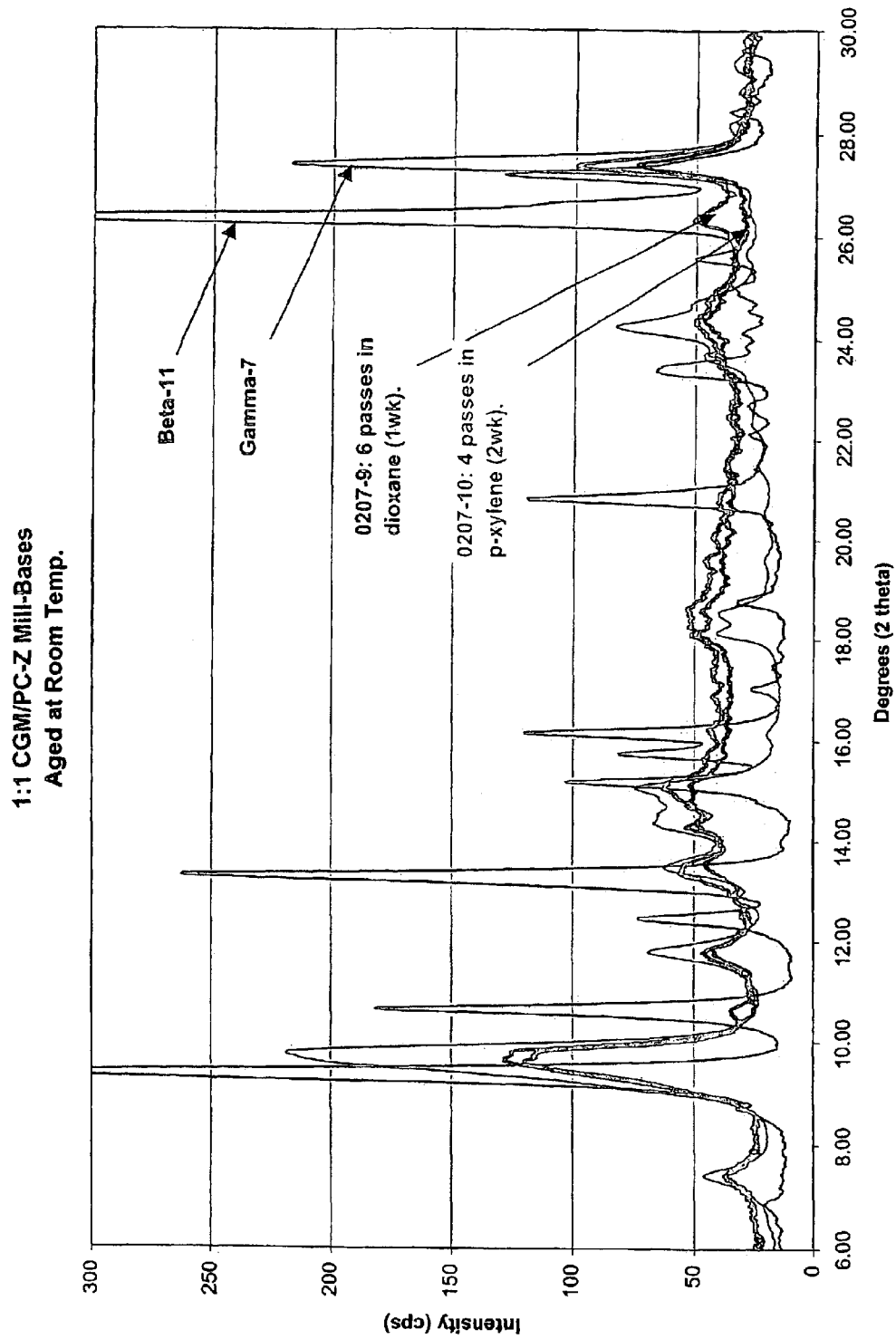
FIG. 9 shows X-ray diffraction spectrum of four samples of titanyl oxyphthalocyanine, two milled with different solvents and different aging, with the data shown in Table 4.
Figure 10:
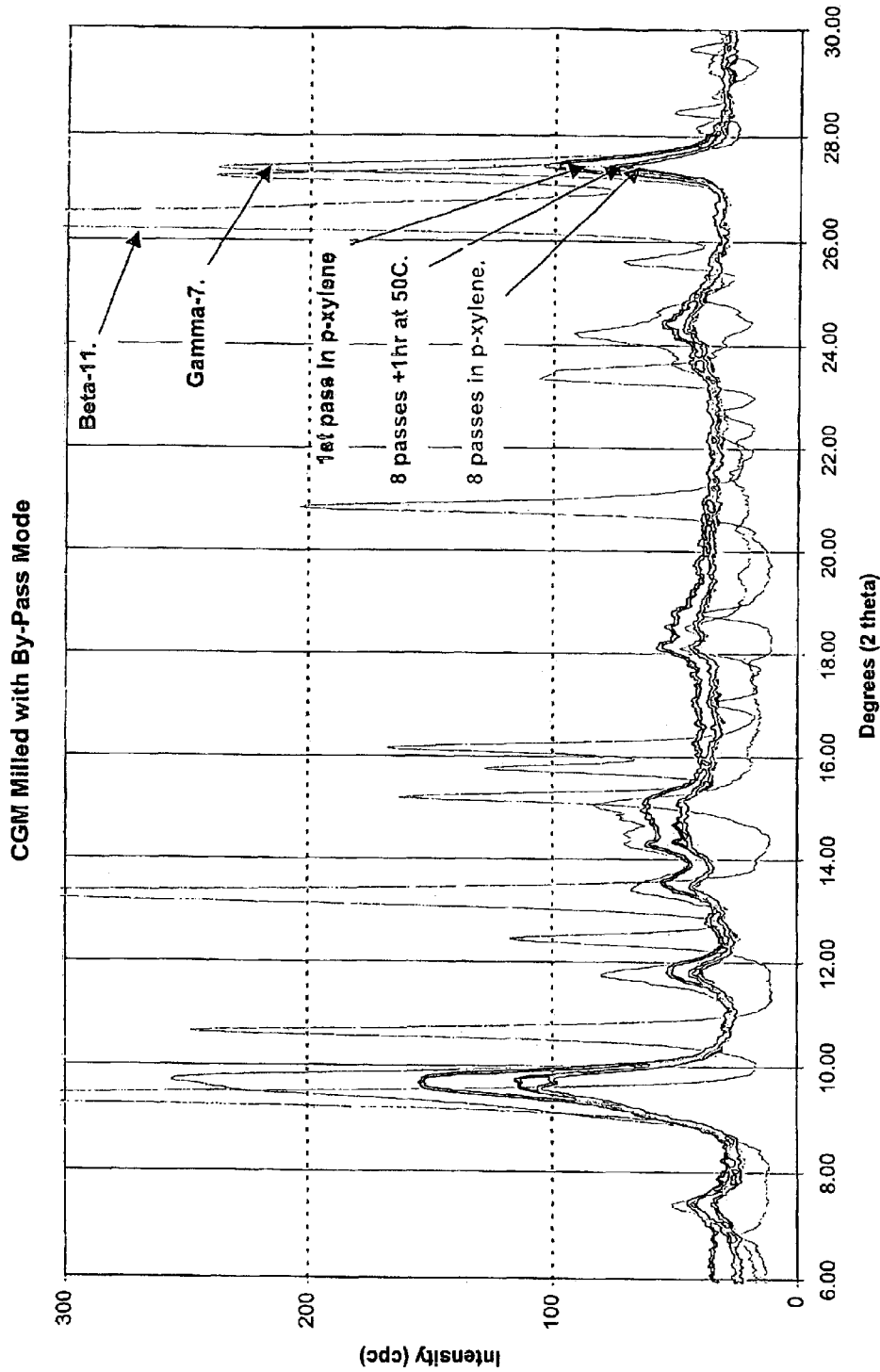
FIG. 10 shows X-ray diffraction spectrum of five samples of titanyl oxyphthalocyanine three milled with p-xylene and one aged for 1 hour, with the data shown in Table 4.
Figure 11:
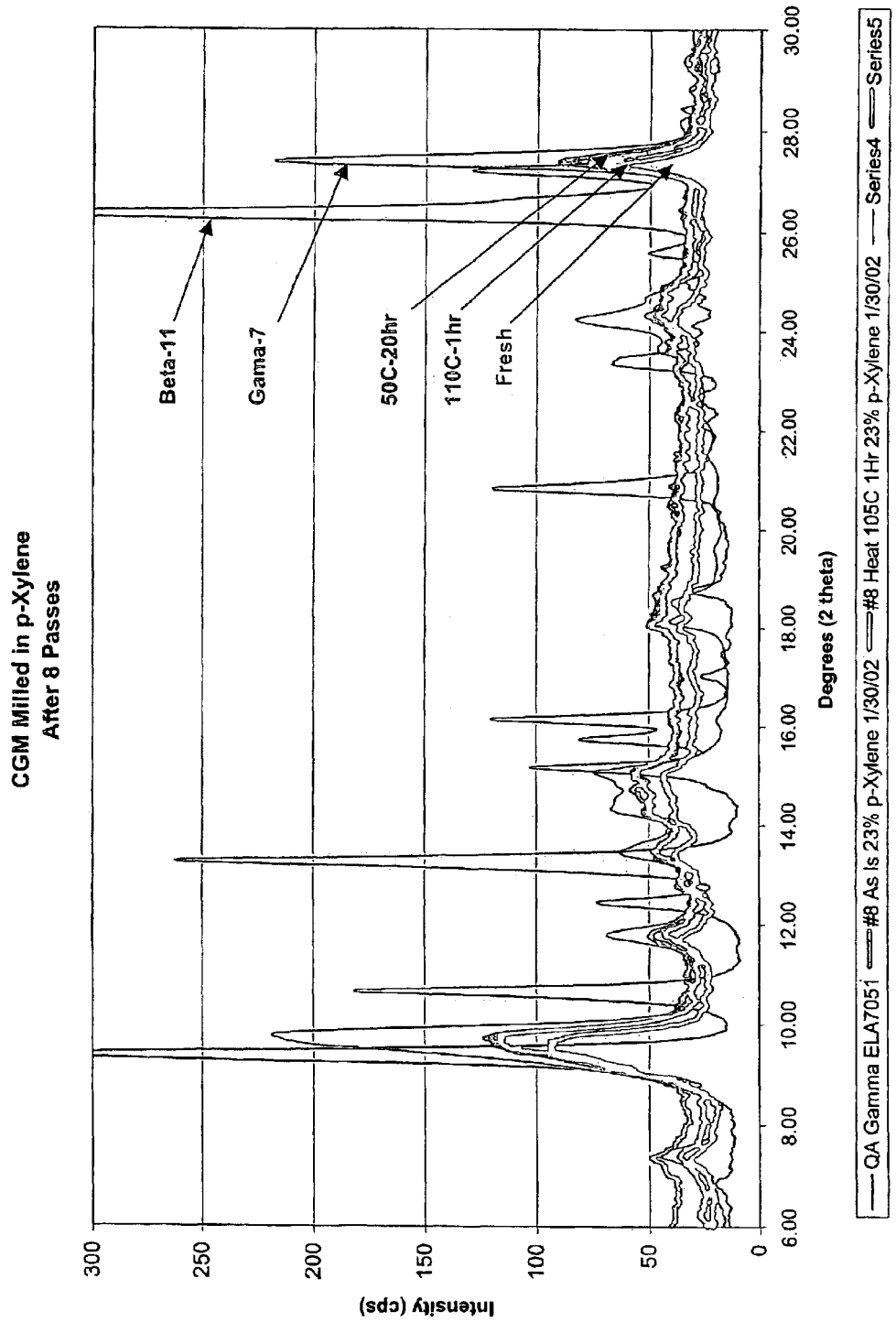
FIG. 11 shows X-ray diffraction spectrum of five samples of titanyl oxyphthalocyanine three milled with p-xylene and two samples aged, with the data shown in Table 4.

Representative embodiments of laminar structure of the electrophotosensitive member of the invention as shown in FIGS. 6a and 6b.

FIG. 6a shows an embodiment, wherein a photosensitive layer 1 is composed of a single layer and comprises a charge-generating material 2 and a charge-transporting material (not shown) together. The photosensitive layer 1 may be disposed on an electroconductive support 3. FIG. 6b shows an embodiment of laminated structure wherein a photosensitive layer 1 comprises a charge generation layer 4 comprising a charge-generating material 2 and a charge transport layer 5 comprising a charge-transporting material (not shown) disposed on the charge generation layer 4; and the charge transport layer 5 may be disposed on an electroconductive support 3. The charge generation layer 4 and the charge transport layer 5 can be disposed in reverse. In production of the electrophotosensitive member, the electroconductive support 3 may be a material having an electroconductivity including: a metal such as aluminum or stainless steel; and metal, plastic or paper having an electroconductive layer.

Between the electroconductive support 3 and the photosensitive layer 1, there can be formed a primer or undercoating layer having a barrier function and an adhesive function as an intermediate layer. The undercoating layer may comprise a substance, such as vinyl copolymers, polyvinyl alcohol, polyethylene oxide, ethyl cellulose, methyl cellulose, casein, polyamide, glue or gelatin. The above substance may be dissolved in an appropriate solvent and applied onto the electroconductive support 3 to prepare the primer layer. The thickness of the primer layer may be about 0.2–3.0 microns.

The photosensitive layer which is composed of a single layer as shown in FIG. 6b may be formed by mixing the charge-generating material comprising the titanium oxyphthalocyanine crystal used in the invention and the charge-transporting material with an appropriate solution containing a binder resin, applying the resultant coating liquid and then drying the coating.

The charge generation layer of the photosensitive layer having a laminated structure as shown in FIG. 6b may be formed by dispersing the charge-generating material comprising the titanium oxyphthalocyanine crystal used in the invention in an appropriate solution containing a binder resin, applying the resultant coating liquid and then drying the coating. It is possible not to use the binder resin in the above solution. The charge generation layer may also be formed by vapor deposition. Examples of the binder resin as described above may include: polyester, acrylic resins, polyvinylcarbazole, phenoxy resins, polycarbonate, polyvinyl butyral, polystyrene, vinyl acetate resins, polysulfone, polyarylate or vinylidene chloride-acrylonitrile copolymers.

The charge transport layer may be formed by dissolving a charge-transporting material and a binder resin in an appropriate solvent, applying the resultant coating liquid and then drying the coating. Examples of the charge-transporting material used may include: triaryl amine compounds, hydrazone compounds, stilbene compounds, pyrazoline compounds, oxazole compounds, thiazole compounds or triaryl methane compounds. As the binder resin, the above-mentioned resins can be used. The method for applying the photosensitive layer(s) may be: dipping, spray coating, spinner coating, bead coating, blade coating bar coating or beam coating.

In formulating the photosensitive layer, when the photosensitive layer is composed of a single layer, the charge-generating material and the charge-transporting material may preferably be contained in the photosensitive layer in amounts of 2–20 wt. % and 30–80 wt. %, respectively, particularly 2–10 wt. % and 40–70 wt. %, respectively. When the photosensitive layer has a laminated structure, the charge-generating material may preferably be contained in the charge generation layer in an amount of 20–80 wt. %, particularly 50–70 wt. %, and the charge-transporting material may preferably be contained in the charge transport layer in an amount of 30–70 wt. %, particularly 40–60 wt. %. The thickness of the photosensitive layer which is composed of a single layer may preferably be 5–40 microns, more preferably 10–30 microns. When the photosensitive layer has a laminated structure, the thickness of the charge generation layer may preferably be 0.01–10 microns, more preferably 0.05–5 microns and the thickness of the charge transport layer may preferably be 5–40 microns, more preferably 10–30 microns. In order to protect the photosensitive layer from external shock, a thin protective layer can be further disposed on the photosensitive layer.

When the titanium oxyphthalocyanine crystal is used as the charge-generating material, it is possible to mix the titanium oxyphthalocyanine crystal with another known charge-generating material as desired.

The electrophotosensitive member according to the present invention can be applied to not only a laser beam printer, a light-emitting diode (LED) printer and a cathode-ray tube (CRT) printer but also an ordinary electrophotographic copying machine, a facsimile machine and other applicable fields of electrophotography.

Figure 12:
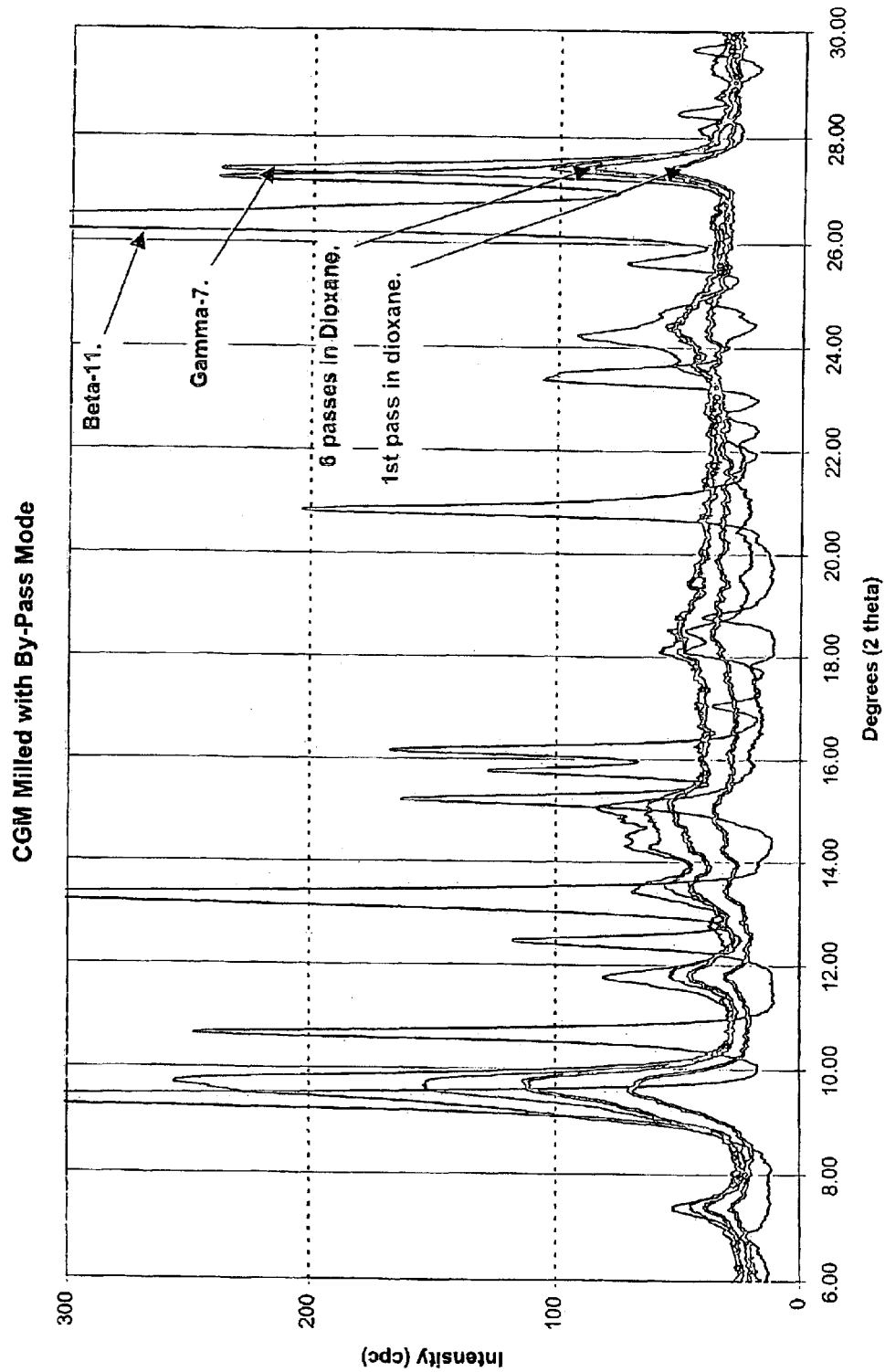
FIG. 12 shows X-ray diffraction spectrum of four samples of titanyl oxyphthalocyanine two milled with dioxane, with the data shown in Table 4.
Figure 13:
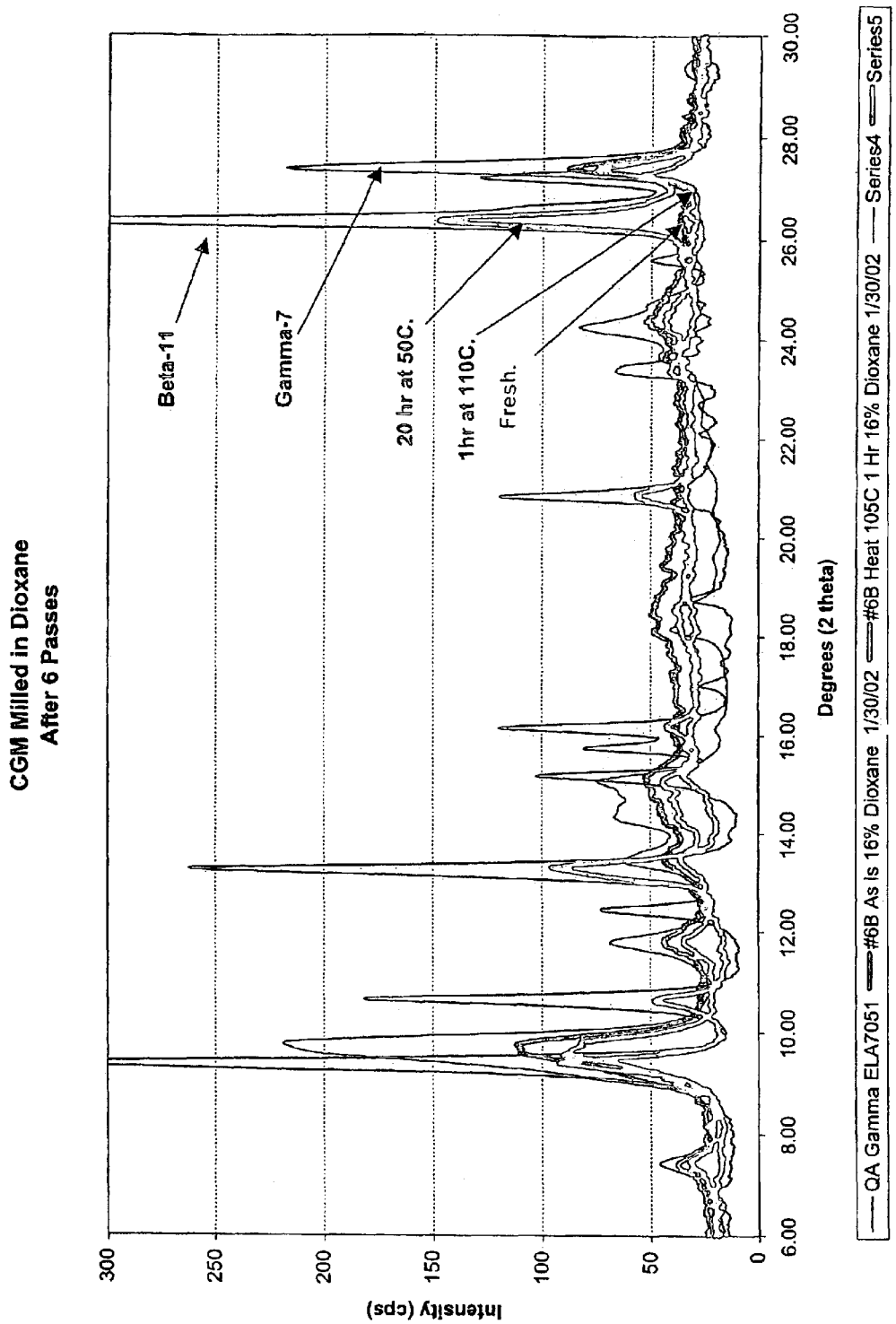
FIG. 13 shows X-ray diffraction spectrum of five samples of titanyl oxyphthalocyanine, three milled with dioxane and two of three samples aged (20 hr @ 50C and 1 hr @ 110C), with the data shown in Table 4.
Figure 14:
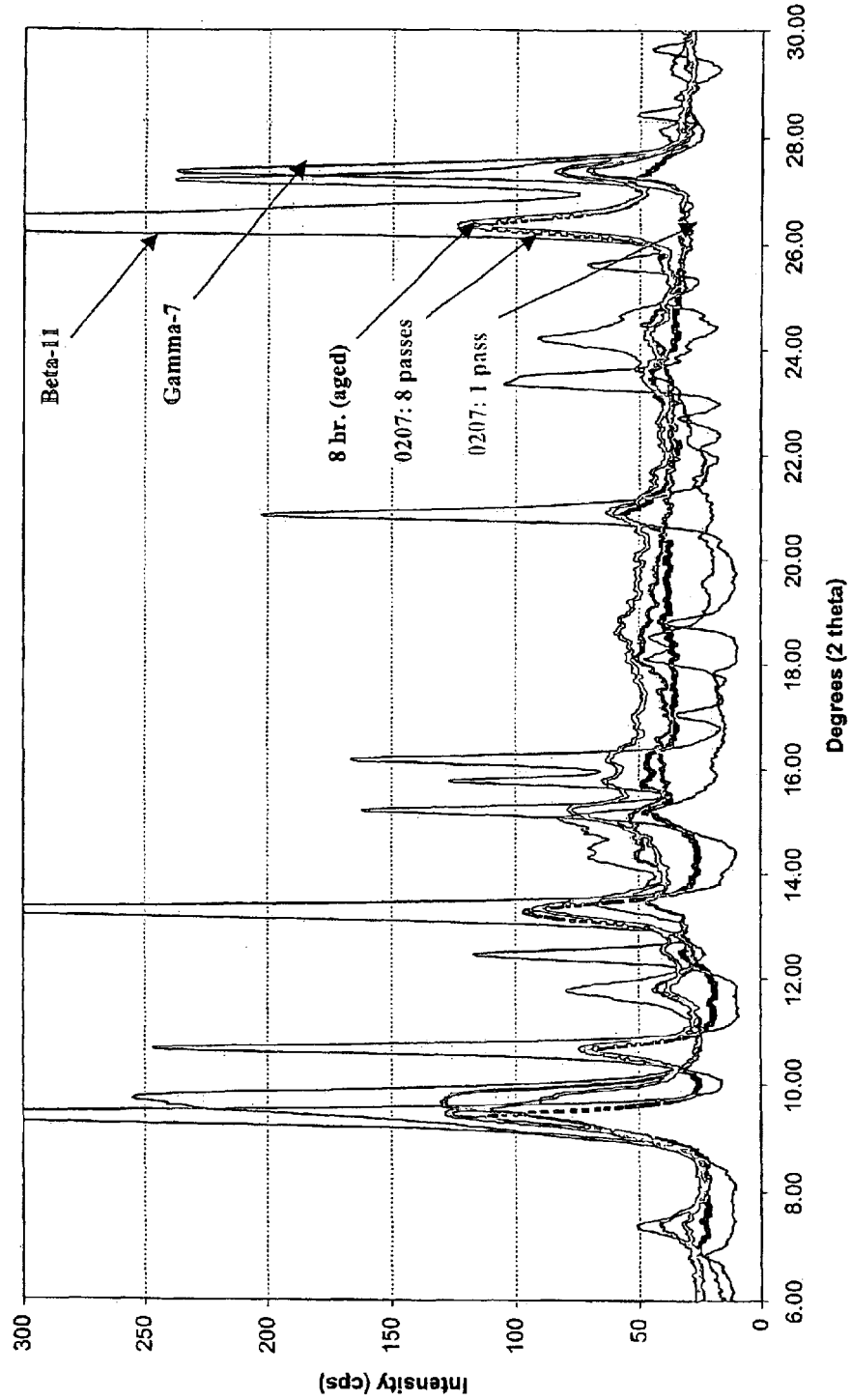
FIG. 14 shows X-ray diffraction spectrum of five samples of titanyl oxyphthalocyanine, three milled with tetrahydrofuran (THF), with one aged, with the data shown in Tables 3 and 4.
Figure 15:
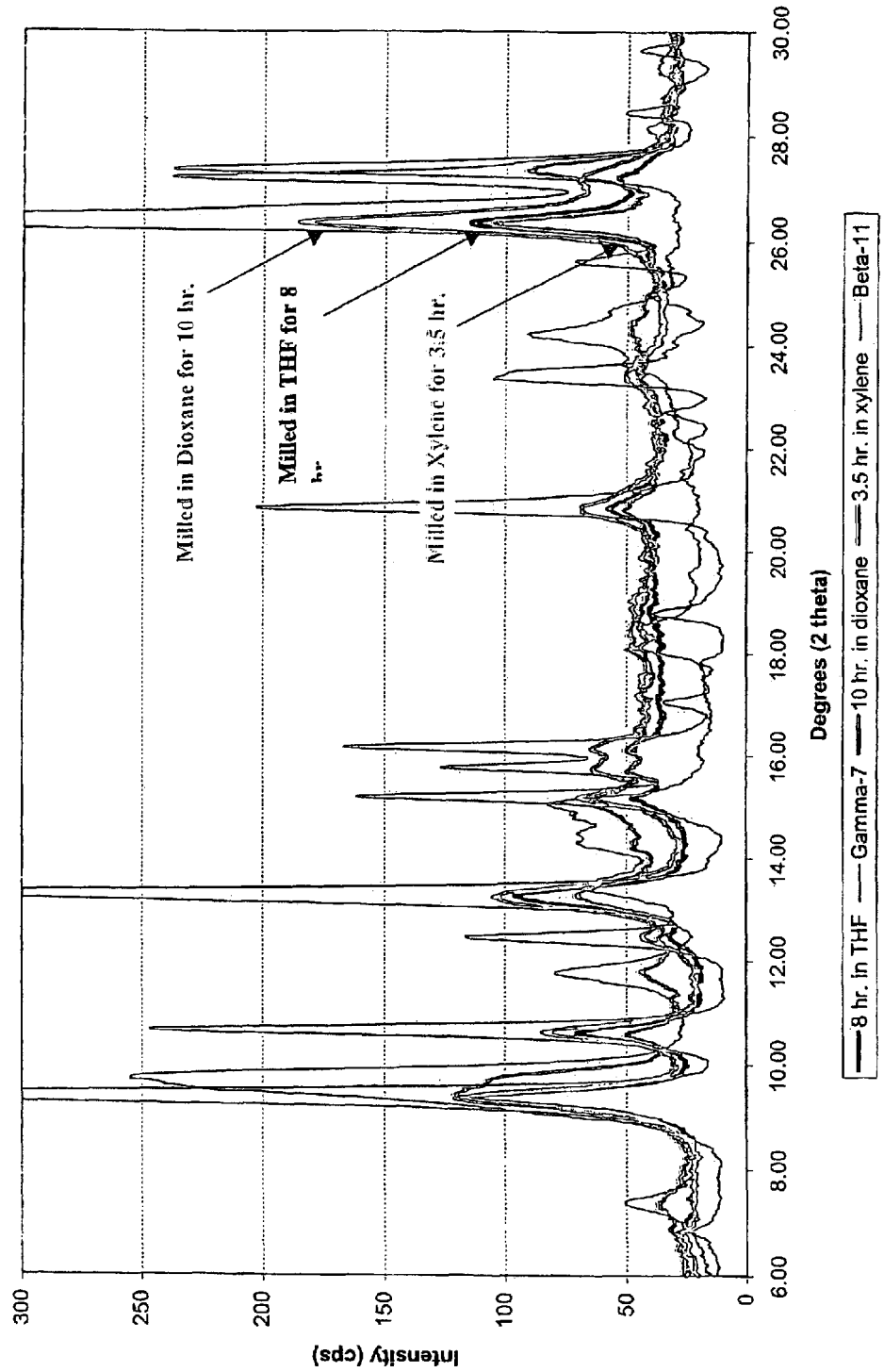
FIG. 15 shows X-ray diffraction data for five titanyl oxyphthalocyanine samples, three milled in different solvents for different lengths of time, the data shown in Table 3.
Figure 16:
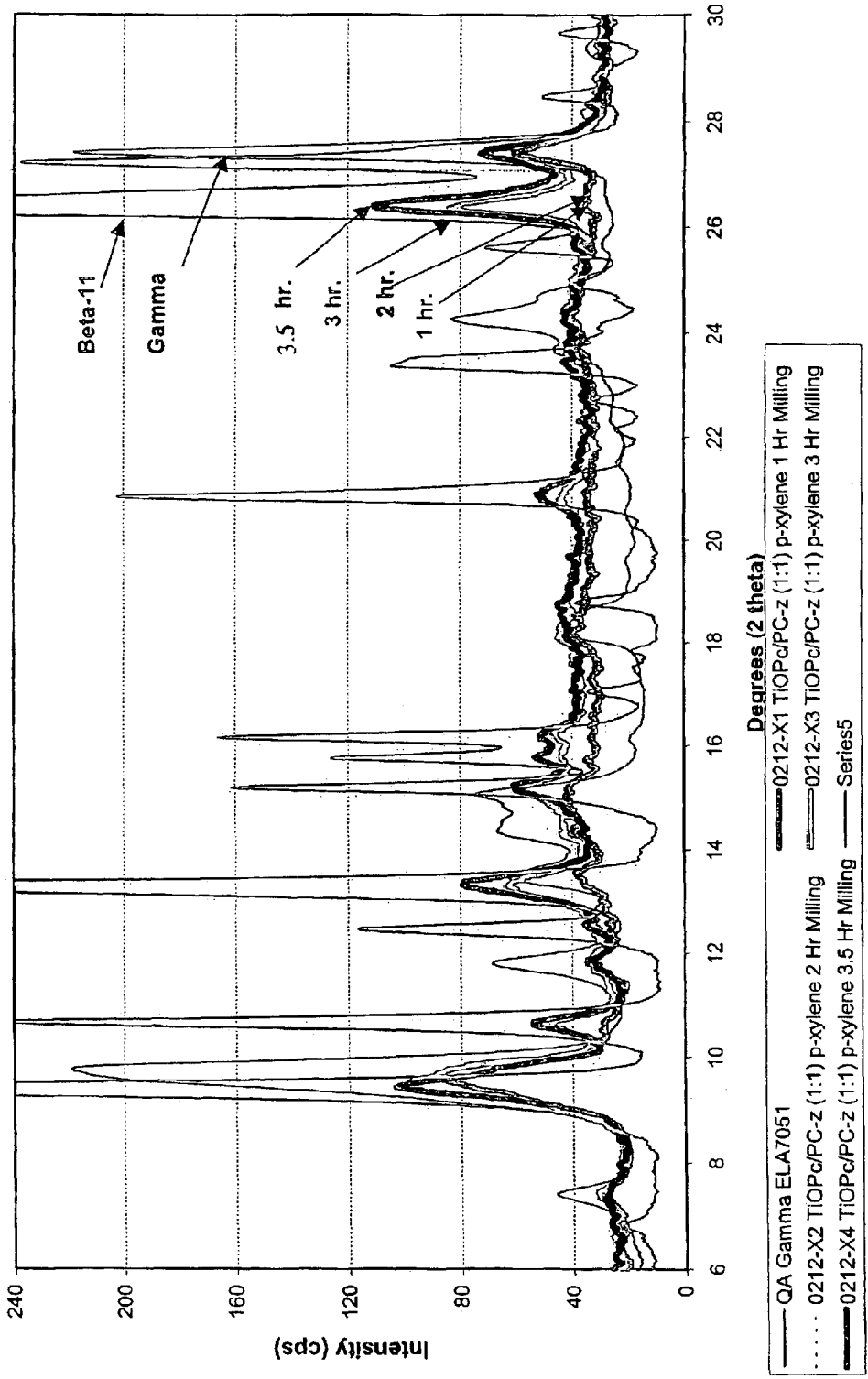
FIG. 16 shows X-ray diffraction spectrum of six samples of titanyl oxyphthalocyanine, four milled with p-xylene for various lengths of time, with the data shown in Table 3.
Figure 17:
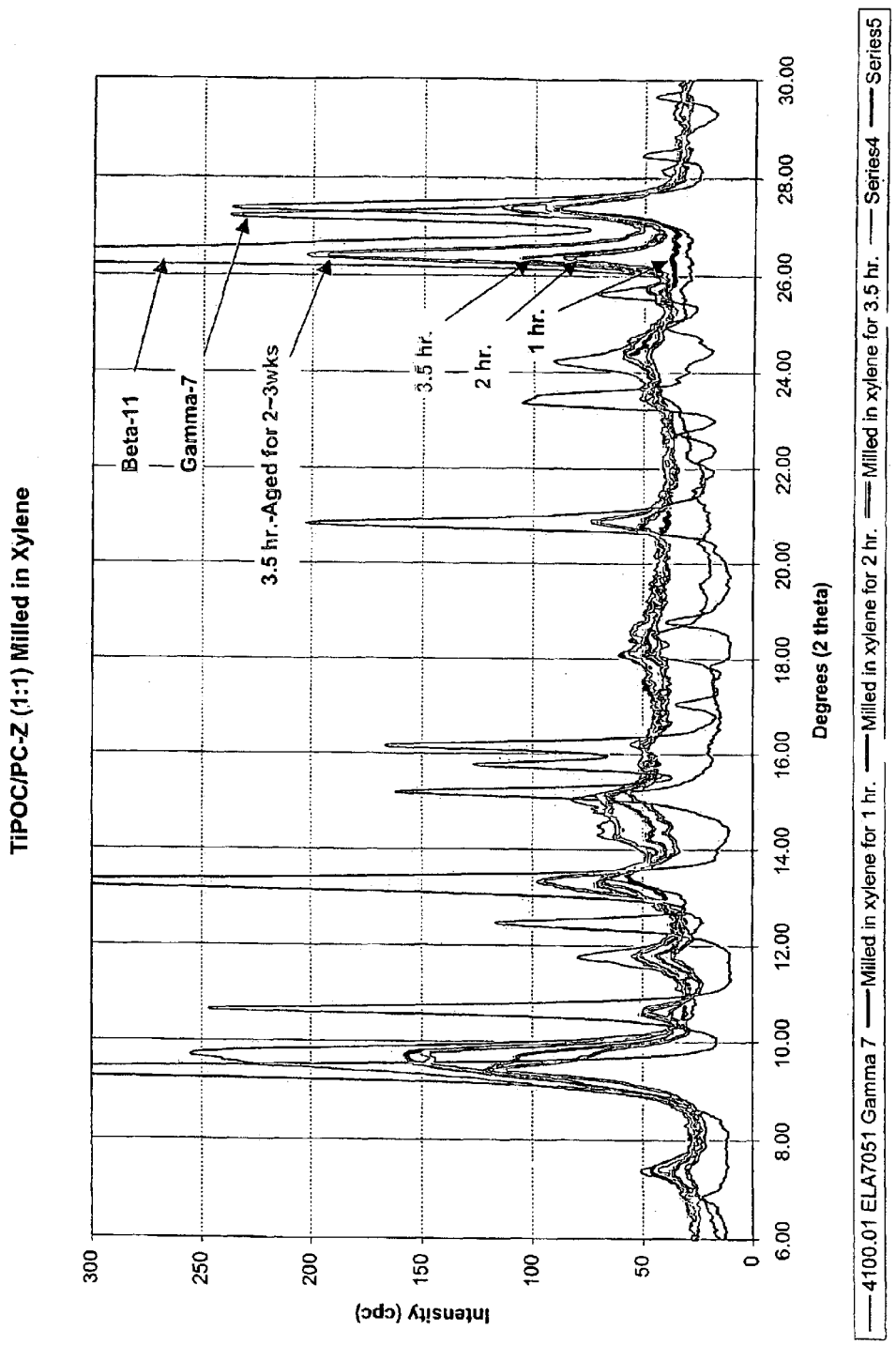
FIG. 17 shows X-ray diffraction spectrum of six samples of titanyl oxyphthalocyanine, four milled with p-xylene for various lengths of time, the data shown in Table 3.
Figure 18:
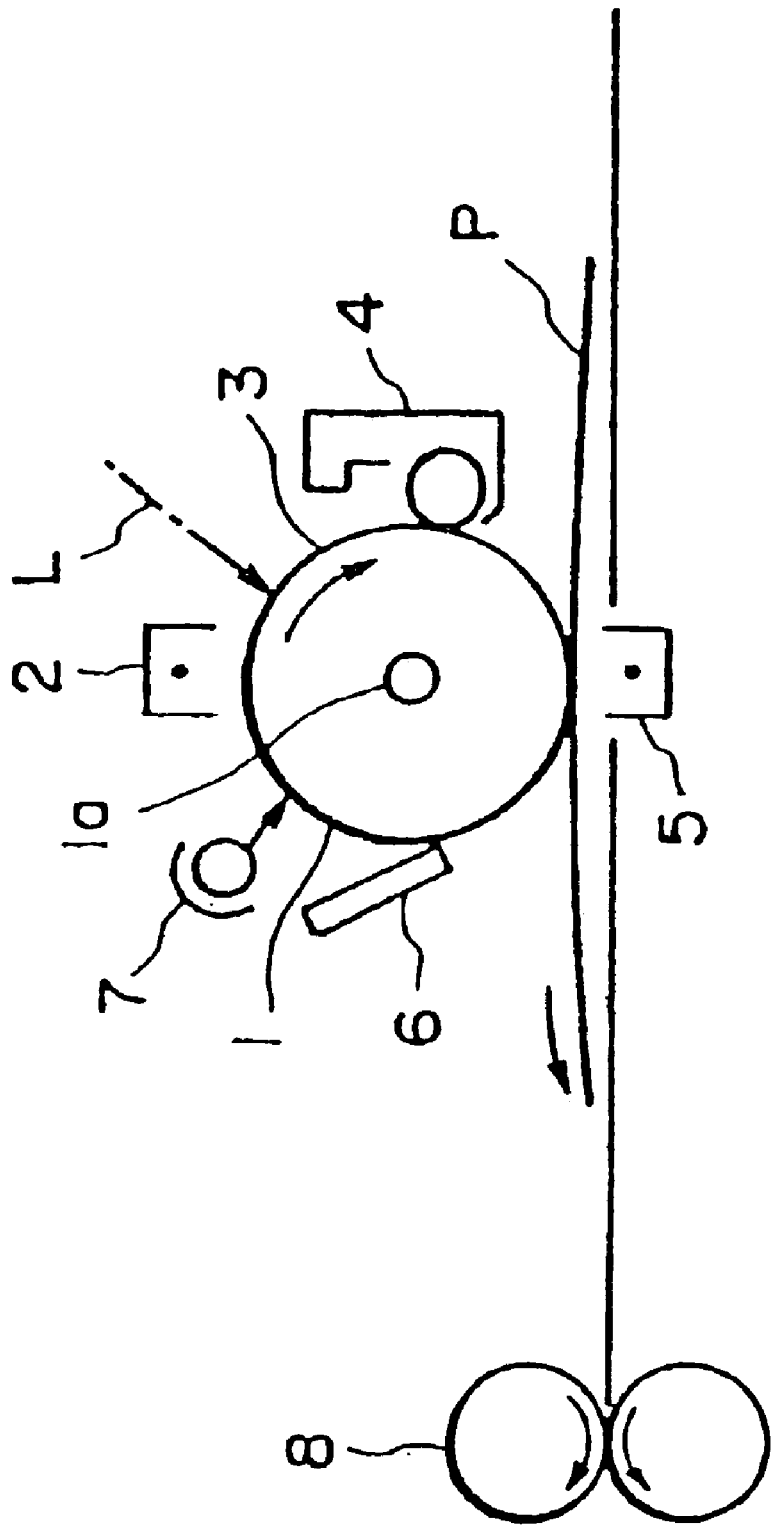
FIG. 18 shows a schematic of an imaging apparatus according to general practices that may incorporate the materials of the invention.
Figure 19:
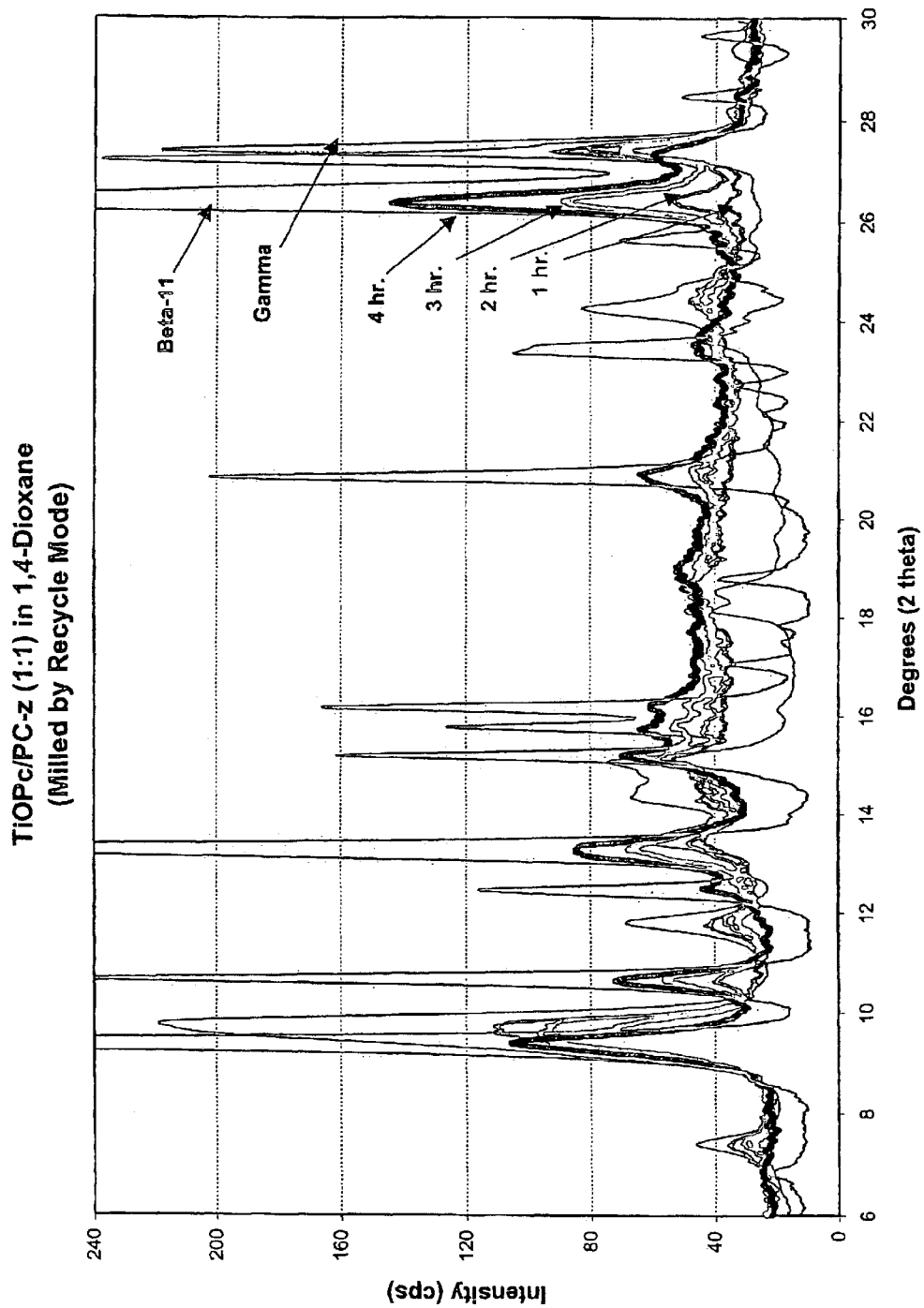
FIG. 19 shows X-ray diffraction patterns of six TiOPc samples, four milled with 1,4-dioxane for various lengths of time, the data shown in Table 3.
Figure 20:
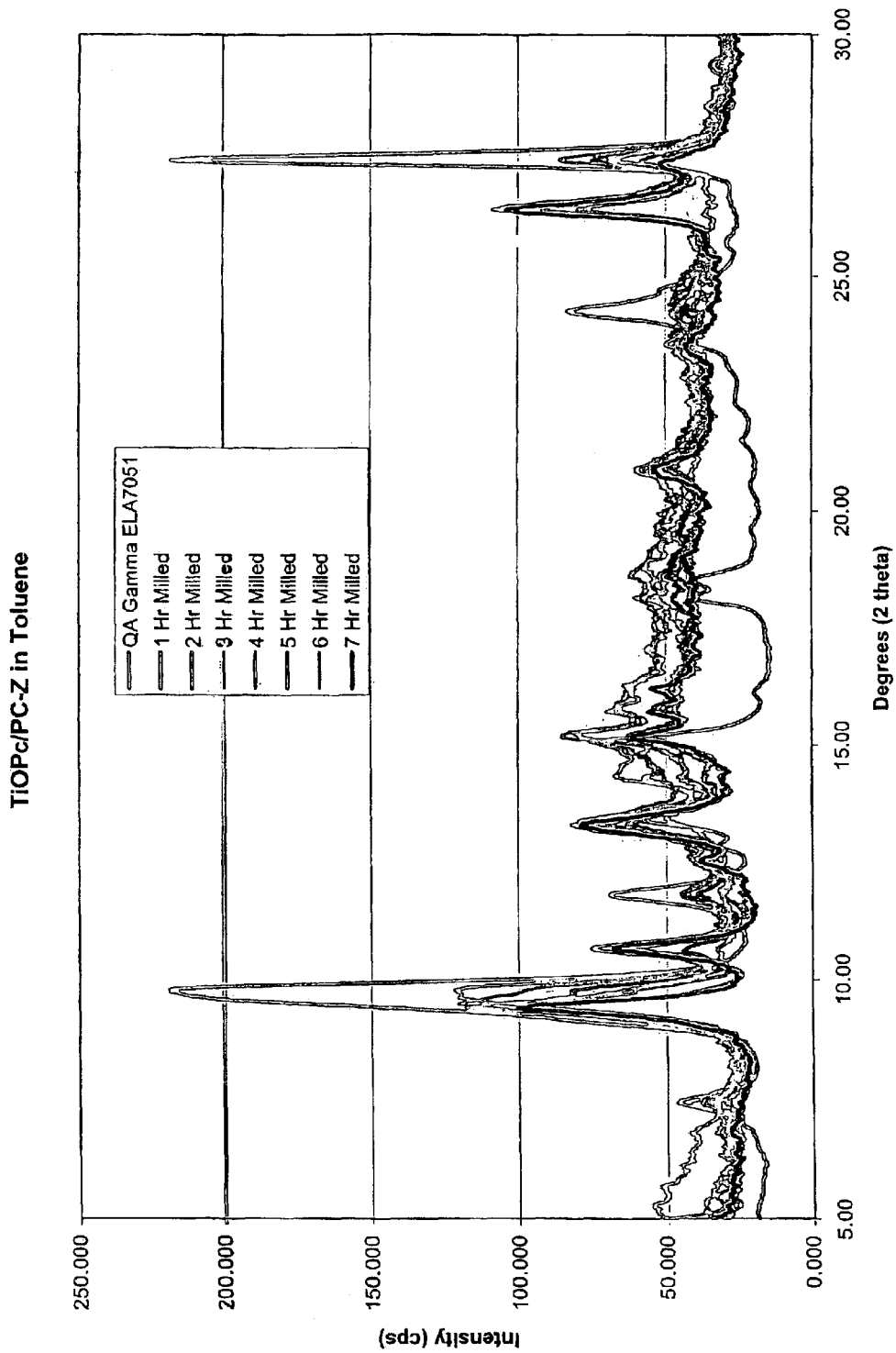
FIG. 20 shows X-ray diffraction patterns of eight TiOPc samples, seven milled with toluene for various lengths of time.
Figure 21:
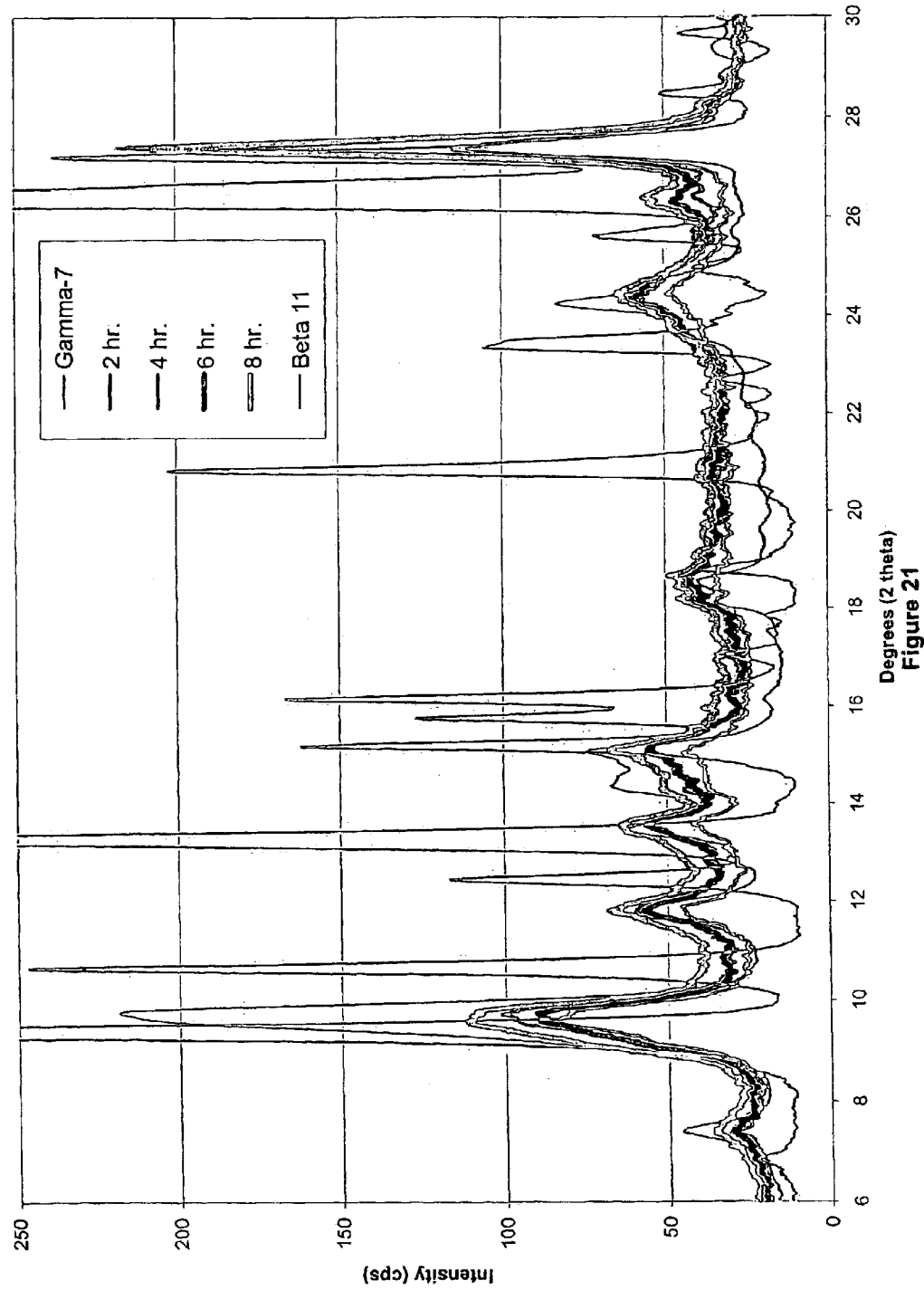
FIG. 21 shows X-ray diffraction patterns of six TiOPc samples, four milled with methylethylketone for various lengths of time.
Figure 22:
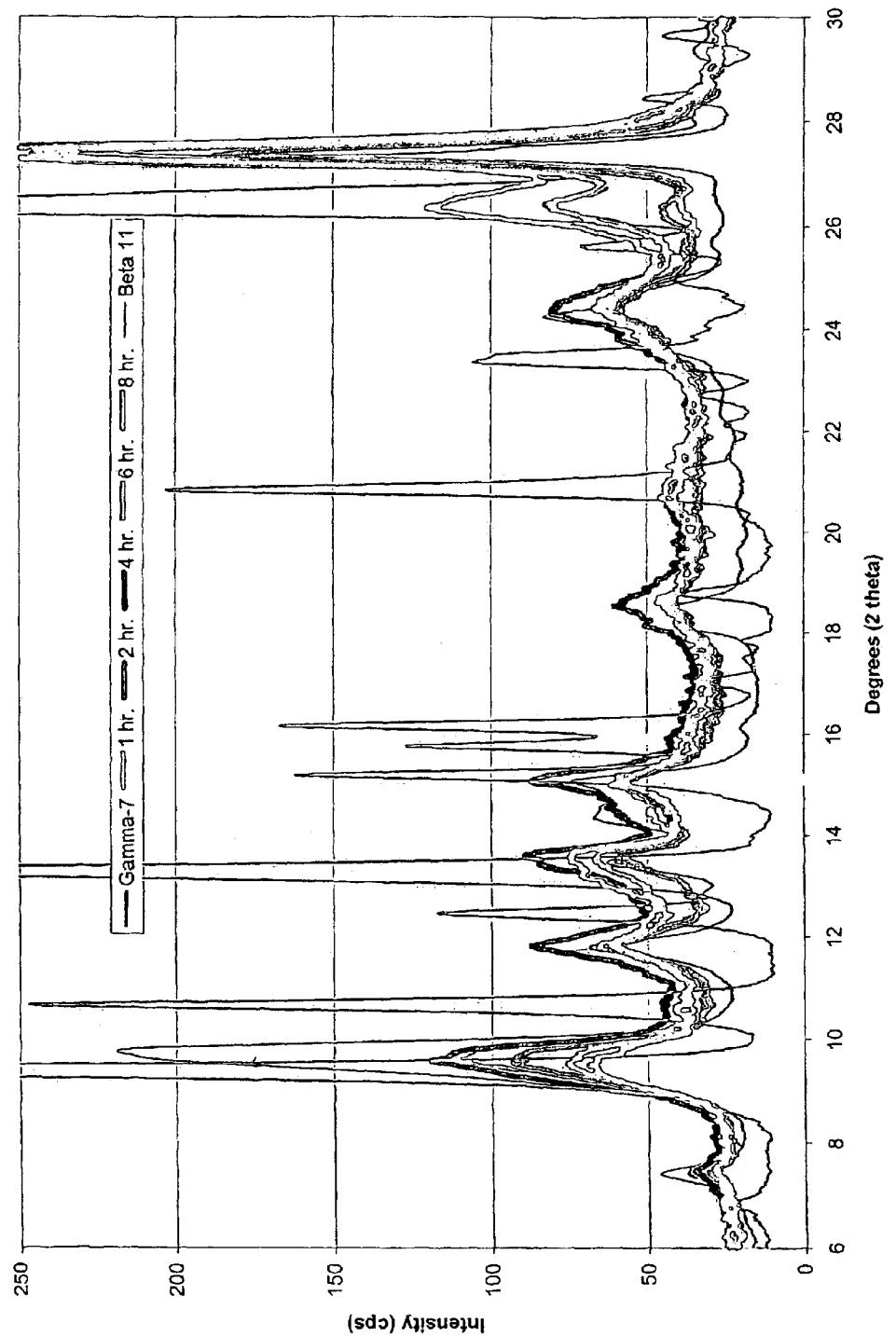
FIG. 22 shows X-ray diffraction patterns of seven TiOPc samples, five milled with methylethylketone for various lengths of time, the data shown in Table 2.
Figure 23:
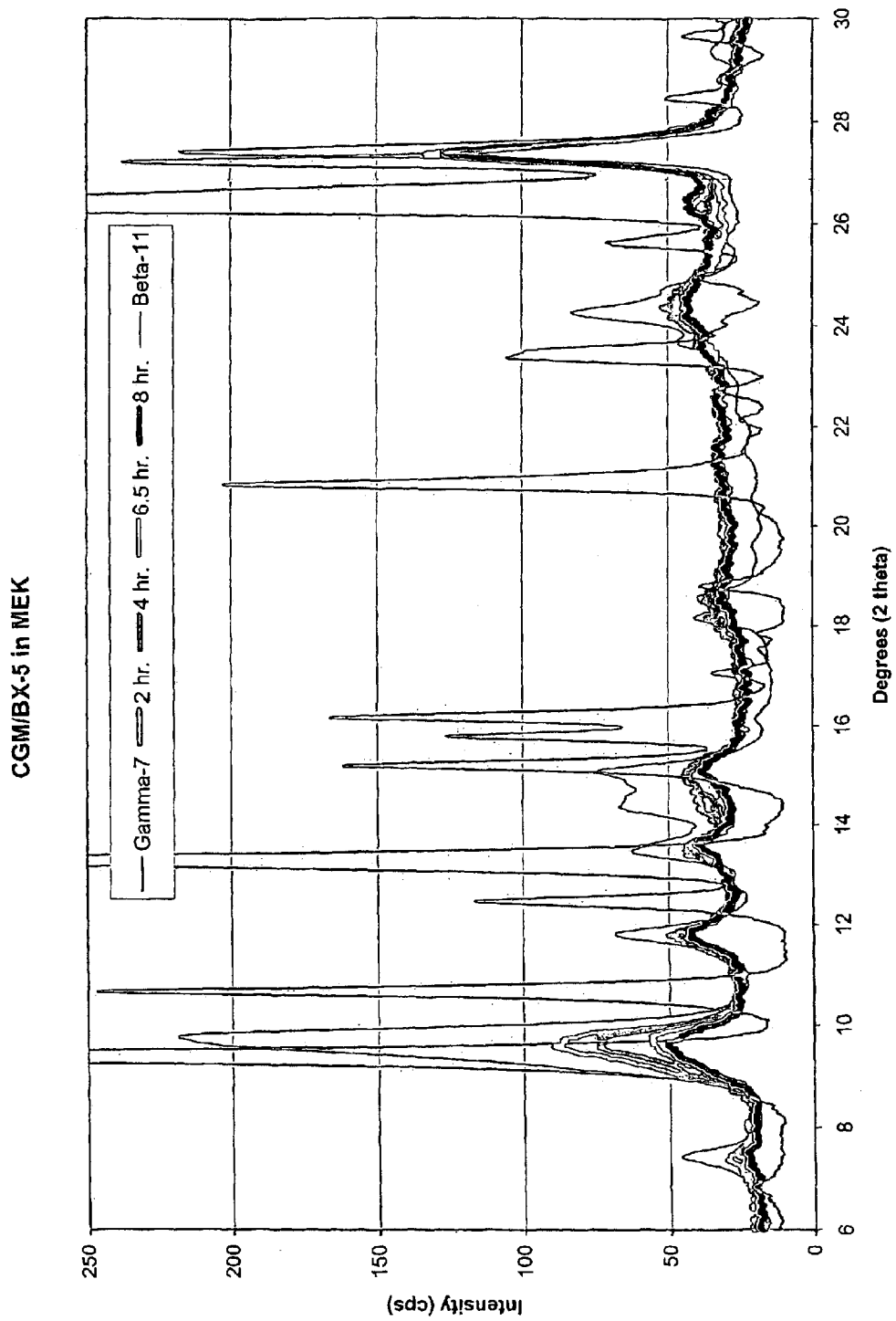
FIG. 23 shows X-ray diffraction patterns of six TiOPc samples, four milled with methylethylketone for various lengths of time.
Figure 24:
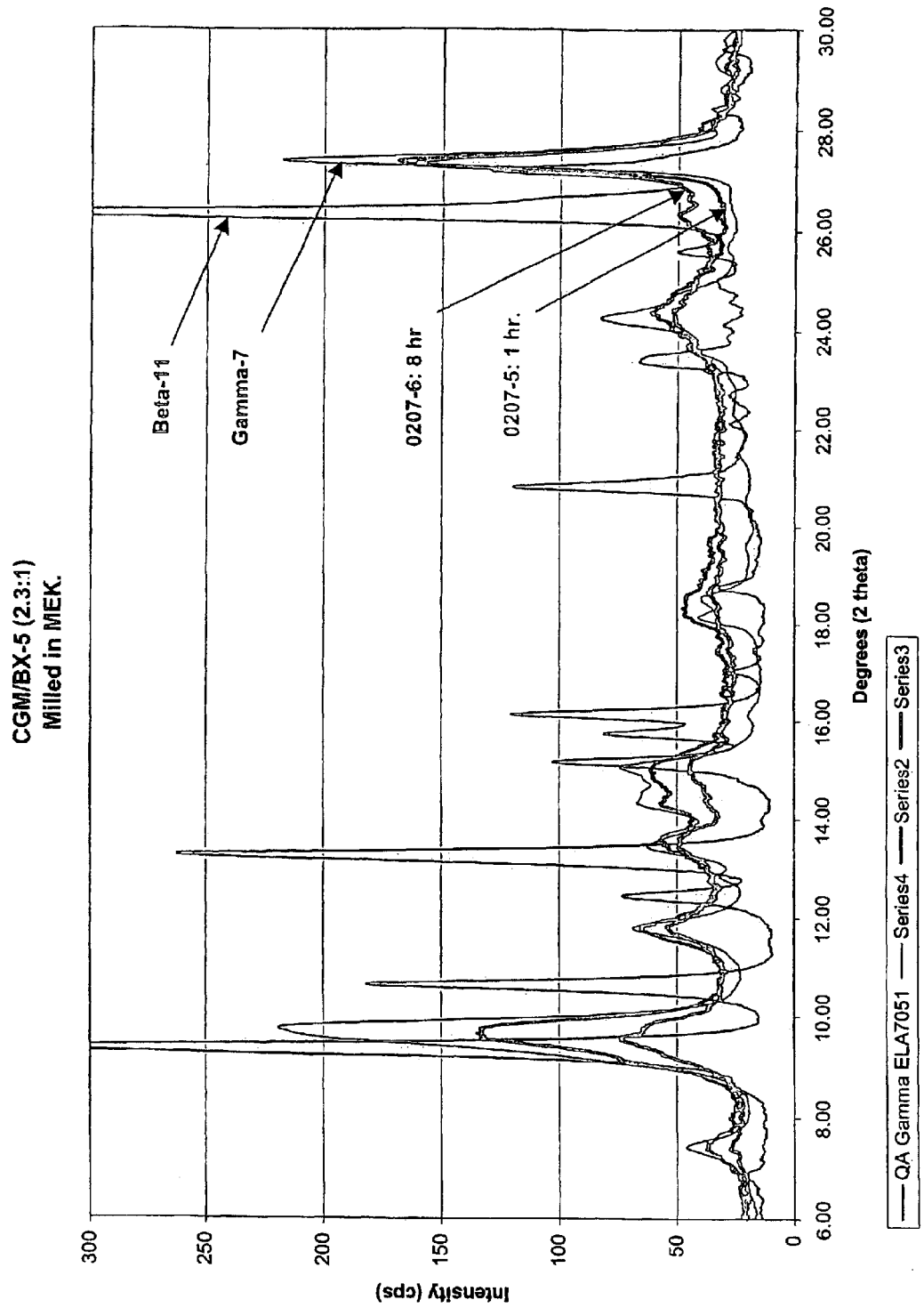
FIG. 24 shows X-ray diffraction patterns of four TiOPc samples, two milled with methylethylketone for various lengths of time, the data shown in Table 3.
Figure 25:
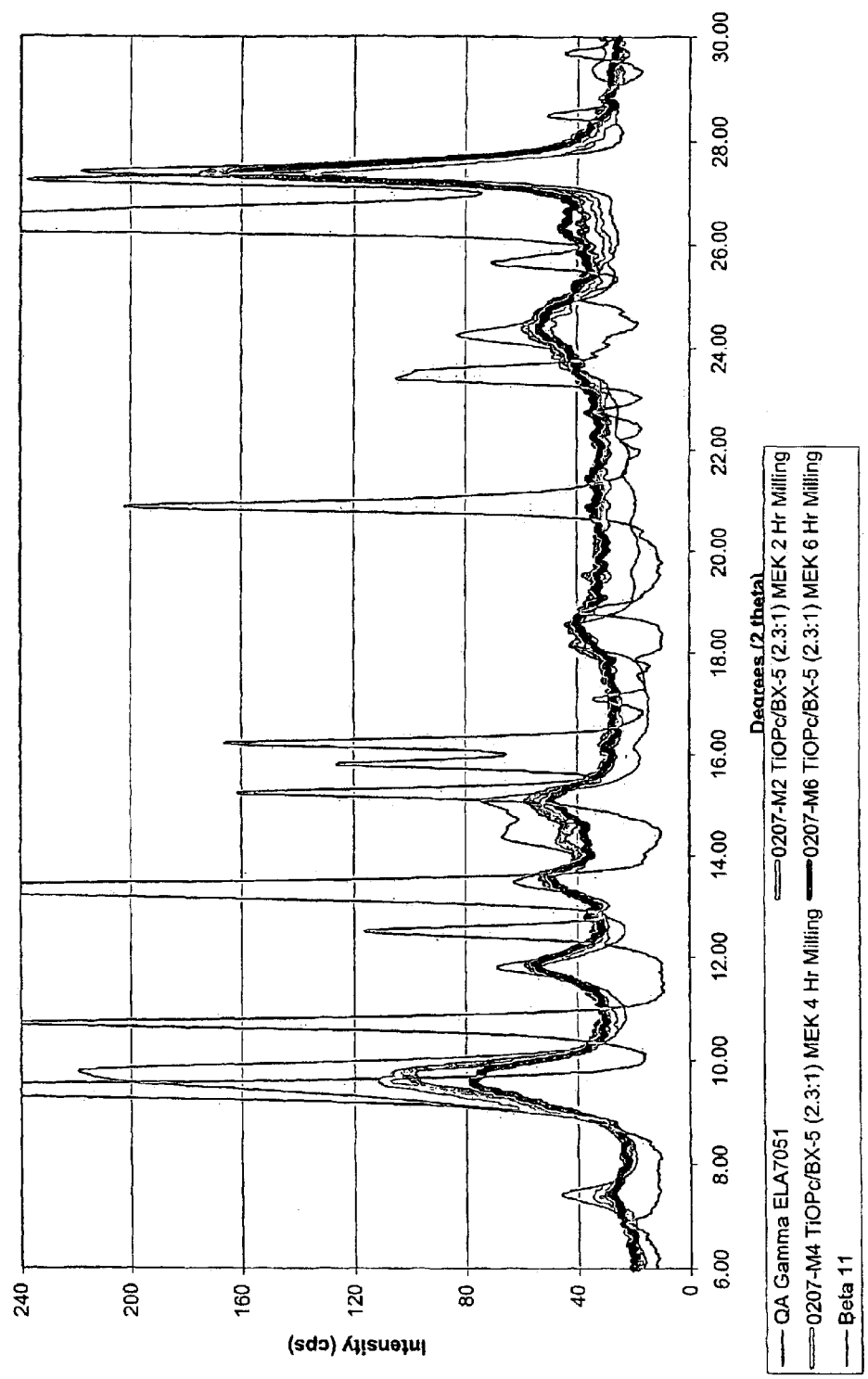
FIG. 25 shows X-ray diffraction patterns of five TiOPc samples, four milled with methylethylketone for various lengths of time, the data shown in Table 3.
Figure 26:
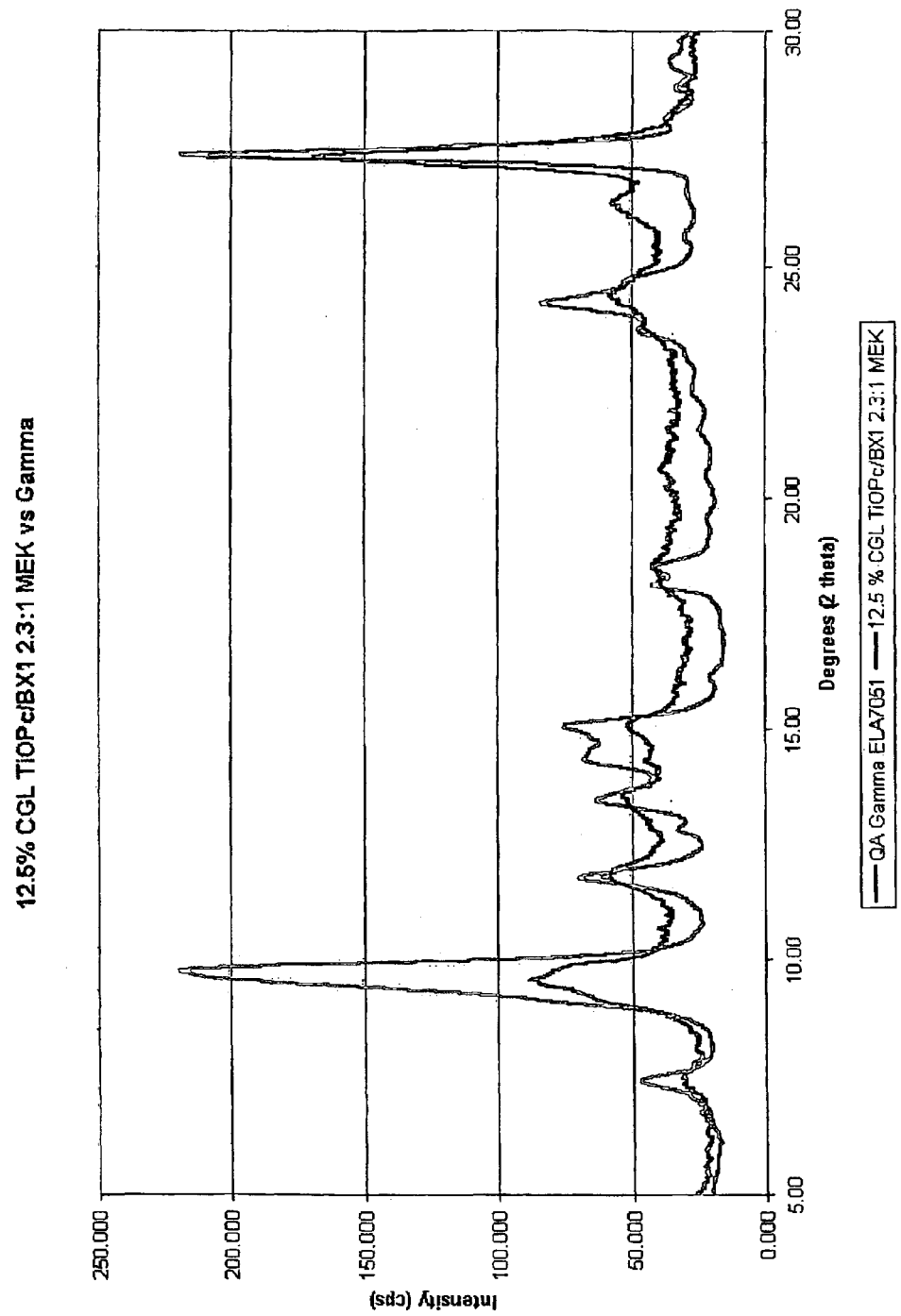
FIG. 26 shows X-ray diffraction patterns of two TiOPc samples, one stored in methylethylketone, the data shown in Table 3.
Figure 27:
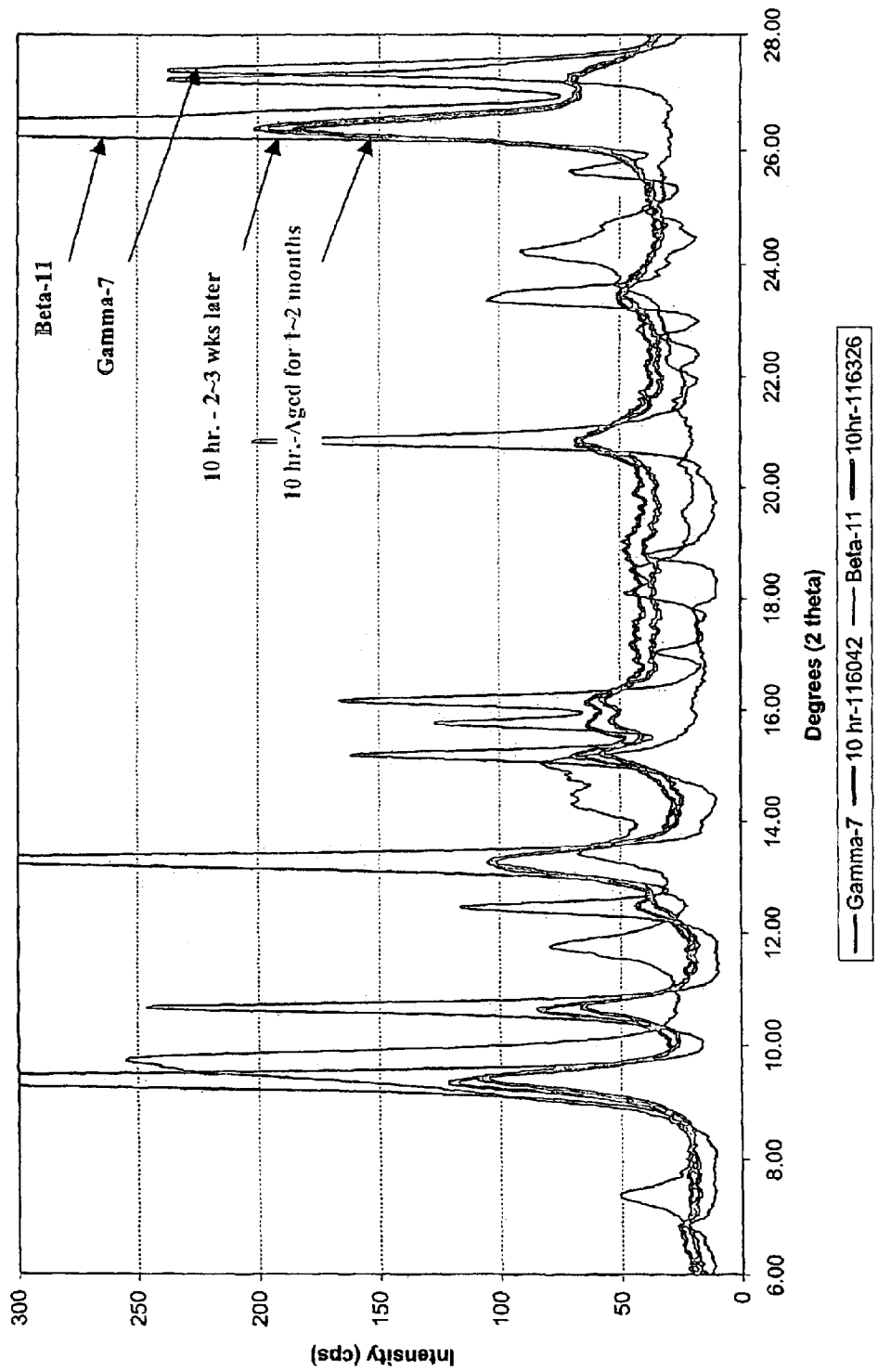
FIG. 27 shows X-ray diffraction patterns of four TiOPc samples, two milled with dioxane and aged for various length of time at RT, the data shown in Table 3.
Figure 28:
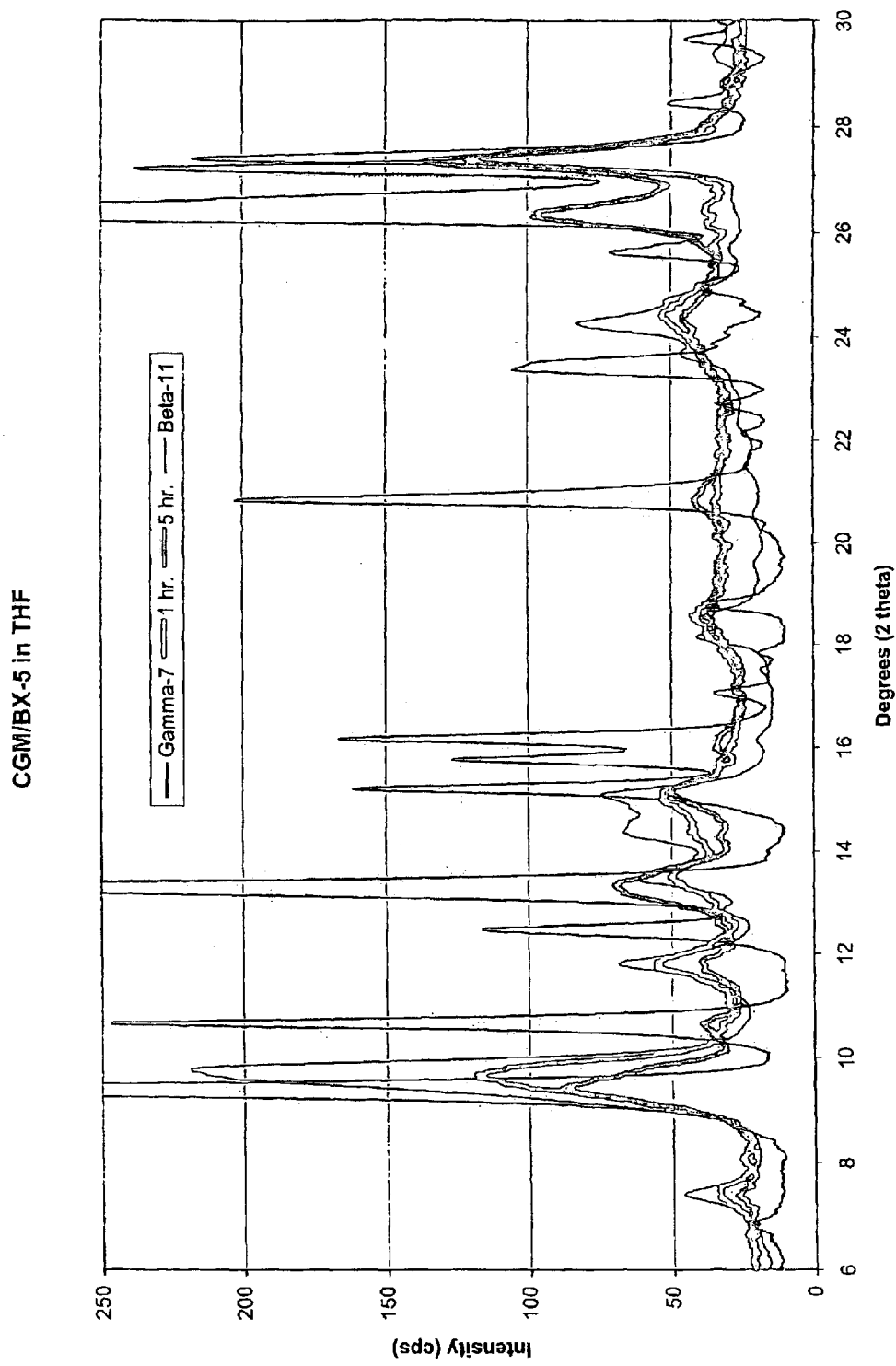
FIG. 28 shows X-ray diffraction patterns of four TiOPC samples, two milled in tetrahydrofuran for various lengths of time.
Figure 29:
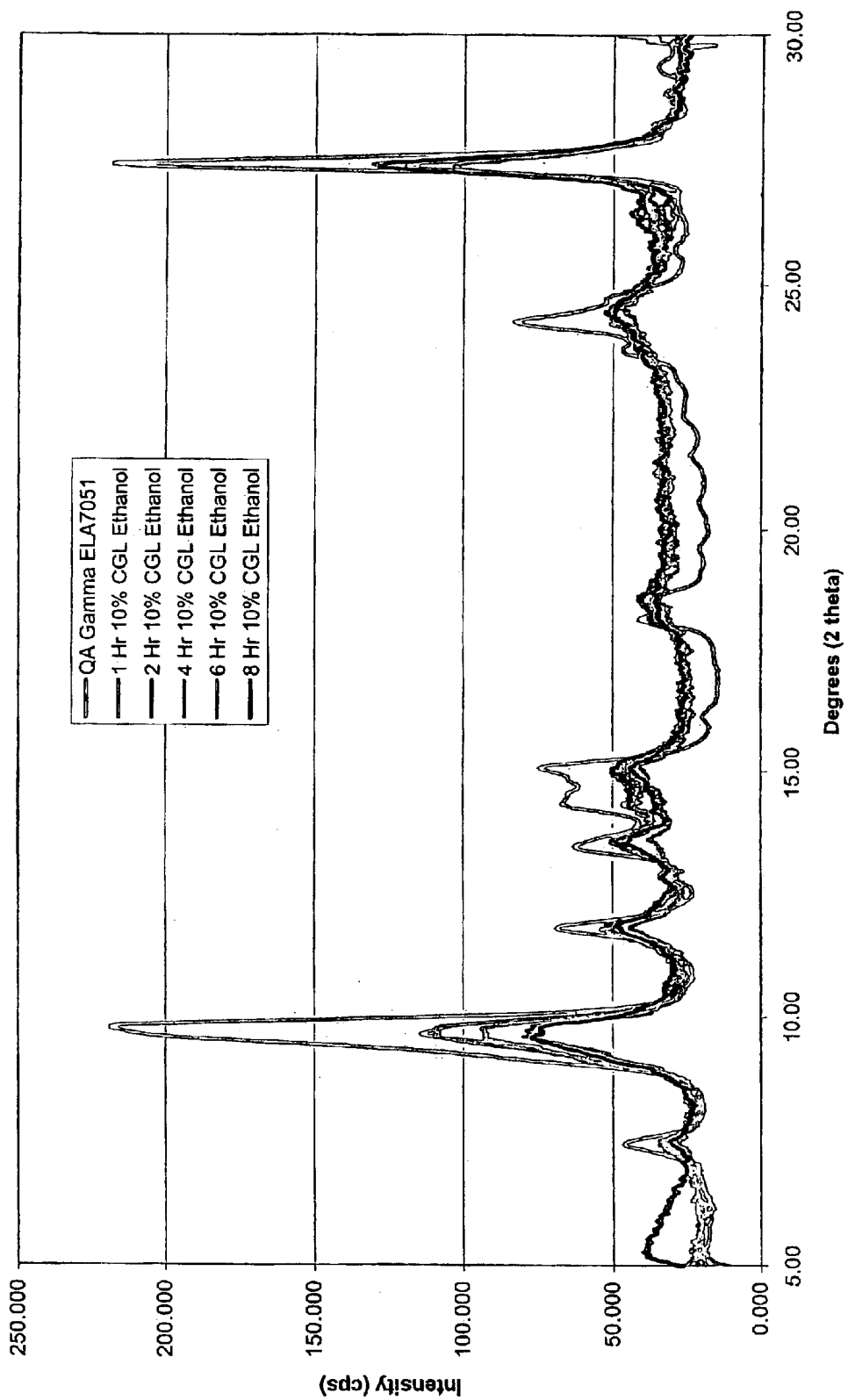
FIG. 29 shows X-ray diffraction patterns of six TiOPc samples, five milled in ethanol for various lengths of time.

FIG. 12 shows a schematic structural view of an ordinary transfer-type electrophotographic apparatus using an electrophotosensitive member of the invention. Referring to FIG. 12, a photosensitive drum (i.e., photosensitive member) 1 as an image-carrying member is rotated about an axis 1a at a prescribed peripheral speed in the direction of the arrow shown inside of the photosensitive drum 1. The surface of the photosensitive drum is uniformly charged by means of a charger 2 to have a prescribed positive or negative potential. The photosensitive drum 1 is exposed to light-image L (as by slit exposure or laser beam-scanning exposure) by using an image exposure means (not shown), whereby an electrostatic latent image corresponding to an exposure image is successively formed on the surface of the photosensitive drum 1. The electrostatic latent image is developed by a developing means 4 to form a toner image. The toner image is successively transferred to a transfer material P which is supplied from a supply part (not shown)

to a position between the photosensitive drum 1 and a transfer charger 5 in synchronism with the rotating speed of the photosensitive drum 1, by means of the transfer charger 5. The transfer material P with the toner image thereon is separated from the photosensitive drum 1 to be conveyed to a fixing device 8, followed by image fixing to print out the transfer material P as a copy outside the electrophotographic apparatus. Residual toner particles on the surface of the photosensitive drum 1 after the transfer are removed by means of a cleaner 6 to provide a cleaned surface, and residual charge on the surface of the photosensitive drum 1 is erased by a pre-exposure means 7 to prepare for the next cycle. As the charger 2 for charging the photosensitive drum 1 uniformly, a corona charger is widely used in general. As the transfer charger 5, such a corona charger is also widely used in general.

When forming a photosensitive layer of the two-layer composition, a carrier generating layer 2 can be provided by the following methods:

(a) By coating a solution formed by dissolving carrier generating substance in some proper solvent or adding binder to it and mixing, or (b) By coating a dispersing solution formed by grinding the carrier generating substance into fine particles with the appropriate devices, conditions and/or solvents (optionally in a dispersive medium) and adding binder if necessary and mixing, dispersing and coating.

Uniform dispersion is possible by dispersing particles under supersonic waves when using these methods. For solvent or dispersive medium used to form the carrier generating layer during coating, n-buthylamine, diethylamine, isopropanolamine, triethanolamine, triethylene diamine, N, N-dimethylformamide, acetone, methyl ethyl ketone, cyclohexanone, benzene, toluene, xylene, chloroform, 1, 2-dichloroethane, dichloromethane, tetrahydrofuran, dioxane, methanol, ethanol, isopropanol, ethyl acetate, butyl acetate, dimethyl sulfoxide, etc. can be used, by way of non-limiting examples.

When a binder is used to form the carrier generating layer or carrier transporting layer, it may be any type but especially high molecular polymer which has ability to form hydrophobic insulated film of high dielectric constant is desirable. Such polymers include, by way of non-limiting examples, at least the following binders, but are not limited thereto: (a) Polycarbonate (especially Polycarbonate Z resin), (b) Polyester, (c) Methacrylic resins, (d) Acrylic resins, (e) polyvinyl resins, such as Polyvinyl chloride, Polyvinylidene chloride, Polyvinyl acetate, Polyvinyl butyral, (f) Polystyrene, (g) Styrene-butadiene copolymer, styrene-butadiene-acrylonitrile terpolymers, (h) Vinylidene chloride-acrylonitrile copolymers, (i) Vinyl chloride-vinyl acetate copolymer, (j) Vinyl chloride-vinyl acetate-maleic anhydride copolymer, (k) Silicone resin, (l) Silicone-alkyd resin, (m) Phenol-formaldehyde resin, (n) Styrene-alkyd resin, and (o) Poly-N-vinyl carbazole. Both homopolymers and copolymers (with at least two or more comonomeric components), graft copolymers, block copolymers, and the like may be used. The proportions of the binder may vary widely, depending upon the ultimate use, for example, the binder may be from 10–600 weight percent, desirably 50–400 weight percent in proportion to the charge generating material of the invention, and the carrier transporting substance desirably 10–500 weight percent on the same weight basis to the charge generating material. The thickness of the carrier generating layer formed in this way is desirably between about 0.01–20 micrometers and more desirably between 0.05–5 micrometers and the thickness of the carrier transporting layer is about 2–100 micrometers, more desirably between about 3–30 micrometers.

When the above carrier generating substance is dispersed to form a photosensitive layer, it is desirable that the said carrier generating substance has particles with average diameters or major dimensions less then 10, less than 8, less than 5, less than 4, less than 3, or less than 2 micrometers, desirably less than 1 micrometers or less than 0.8 or less than 0.5 um (a preferred target is less than about 0.3 um) in average particle size. When the particle size is too large, the particles cannot be dispersed satisfactorily into the layer and some of particles may be projected beyond the surface deteriorating the smoothness of the surface. In some case, discharge may be caused at the projected particles or toner particles may stick there, causing toner coating phenomenon.

In addition, the said photosensitive layer may contain one or more kinds of electron acceptance substances for the purposes of improving the sensitivity, and reducing the rest potential or fatigue when used repeatedly. For electron acceptance substances which can be used here, succinic anhydride, maleic anhydride, dibromo succinic anhydride, phthalic anhydride, tetrachloro phthalic anhydride, tetrabromo phthalic anhydride, 3-nitro phthalic anhydride, 4-nitro phthalic anhydride, pyromellitic anhydride, mellitic acid anhydride, tetracyanoetylene, tetracyanoquinodimethane, 0-dinitrobenzene, m-dinitrobenzene, 1, 3, 5-trintrobenzene, paranitrobenzonitrile, picryl chloride, quinone chlorimide, chloranile, bulmanile dichlorodicyanoparabenzoquinone, anthraquinone, dinitroanthraquinone, 9-fluorenylidene malonodinitrile, polynitro-9-fluorenylidene malonodinitrile, picric acid, o-nitrobenzoic acid, p-nitrobenzoic acid, 3,5-dinitrobenzoic acid, pentafluorobenzoic acid, 5-dinitro salicylic acid, phthalic acid, mellitic acid, and other compounds of high electron affinity can be cited. The rate of electron acceptance substance is 100:0.01–200 for the carrier generating substance to electron acceptance substance in volume, desirably 100:0.1–100.

For the support to which the above photosensitive layer is provided, typical supports would include, by way of non-limiting examples, those that are formed by coating, evaporating or laminating metallic plate, metallic drum, or electric conductive polymer, indium oxide or other electric conductive compounds, or electric conductive thin layer composed of aluminum, palladium, gold, etc. to any base such films, sheets, drums, etc. of such non-limiting materials as fabric, paper, plastic film, composite, metallic, ceramic, etc. are used. For the intermediate layer which functions as an adhesive layer or barrier layer, etc., such ones that are composed of high molecular polymer as explained as above binder resin, polyvinyl alcohol, ethyl cellulose, carboxymethyl cellulose, and other organic high molecular substances or aluminum oxide, etc. are used.

Photoreceptors according to this invention are obtained as described above. They have such characteristics that are optimum as semiconductor laser photoreceptors since the maximum value of the titanyl oxyphthalocyanine used in this invention in the photosensitive wavelength region exits in 817 nm.+−0.5 nm and the titanyl oxyphthalocyanine has very stable crystal form so that inversion to other crystal forms is hard to occur. These characteristics are very advantageous to production and application of electrophotographic photoreceptors.

Two type of milling are used in the practices of the present invention. Other forms of milling may also be used. The two described forms are "recycle mode milling" and "pass mode milling." Recycle mode milling refers to a particle size reduction and/or pigment dispersion process in which a pigmented dispersion (a millbase, usually comprising a polymer and pigment) is placed in a vessel (the original vessel) and passed or treated (e.g., by pumping) continuously through the active milling zone of a milling chamber (e.g., the milling chamber of a horizontal sand mill), returning the treated millbase to the original vessel after exiting the milling chamber. Preferably the dispersion in the original vessel is agitated (e.g., by an axial mixer) to ensure homogeneity of the millbase throughout the milling process. In recycle mode milling, not every fluid element in the millbase is exposed to the same shear environment for the same residence time. However, the overall effect is to obtain a more uniform dispersion.

Pass mode milling refers to a particle size reduction and pigment dispersion process in which a pigmented dispersion (millbase) is placed in a first vessel, passed (e.g., by pumping) through the active milling zone of a milling chamber (e.g., the milling chamber of a horizontal sand mill), and collected in a second vessel. Pass mode milling ensures that every fluid element in the millbase is exposed to substantially the same shear environment for substantially the same residence time in the active milling zone. A milling pass is completed when substantially all of the millbase passes from the first vessel through the milling chamber and is collected in the second vessel. Subsequent milling passes may be effected by transferring the collected millbase from the second vessel to the first vessel after completion of the prior milling pass. Preferably the dispersion in the first milling vessel is agitated (e.g., by an axial mixer); more preferably, the dispersion is agitated in both the first and second vessel.

With this invention, photoreceptors of photosensitive wavelength region optimum to light of the middle wavelength region, and especially semiconductor lasers and LEDs can be obtained using original titanyl oxyphthalocyanine according to this invention. The titanyl oxyphthalocyanine according to this invention is excellent in crystal stability to solvents, heat, and mechanical straining force and high in sensitivity as photoreceptors, charging ability, and electric potential stability.

EXAMPLES

A) Formation and Detection of the Novel Crystal Form TiOPc

Details of the developments and investigations on novel crystal form (i.e., S-Form) TiOPc used for single layer OPC have been described above. The definition for S-form can be characterized by x-ray diffraction (XRD) showing all the major gamma-peaks plus a major non-gamma peak at 26.4 without showing any other major non-gamma peaks found in beta-form TiOPc. This establishes that the crystal lattice contains not only distributions of atoms/molecules in the lattice that are found in the gamma form, but also that additional lattice structure arrangements are present that are not consistent with the gamma-form, yet do not encompass all additional lattice structure (and hence not all of the XRD) consistent with the beta-form.

Listed in the Tables 1 and 2, attached below, are the results of peak areas in X-ray diffraction (XRD) for TiOPc powder (i.e., both gamma- and beta-form TiOPc) and for charge generating materials (CGM) mill-bases with the S-form TiOPc that were prepared with different solvents under different milling conditions and under different treatments.

It should be noted that the gamma-form TiOPc listed in Table-1 was ordered from H. W. Sands Corporation (Jupiter, Fla.) and was used for all the CGM millings listed in Table-2. While beta-9 and -11 listed in Table-1 were two different types of Beta-form TiOPc ordered from Syntec (i.e., 10/10.1 and 10/10.4) having different sensitivities of S(780 nm)=35, and 93 m2/J, respectively. Additional XRD data and discussion on TiOPc powder and with heat treatments are also provided above.

There are at least three different ways to obtain S-form TiOPc:

1) Milling with a polymer binder in a selected solvent under specified milling conditions As shown by the first two sets of examples in Table-2, S-form TiOPc can be obtained by milling the gamma-form TiOPc with a polyvinyl butyral resin (e.g., BX-5 from Sekisui Chemical Co. Ltd.) at 2.3:1 weight ratio in MEK using the recycle mode on a horizontal sand mill with 1-micron YTZ (believed to be zirconium) beads. Depending on the percent of solids in the CGM mill-base, the conversion from gamma-form to S-form crystals were detected by XRD in samples after 6 hours of milling at 13% solids or after 1 hour but less than 6 hours of milling at 20% solids.

Storing in a refrigerator and/or adding dioxane or THF to the CGM mill-base of S-form TiOPc did not change the crystal form of the S-form TiOPc. Note that the amounts of solvents added to the CGM mill-bases for XRD tests were equivalent to the amount used in single layer OPC coating solutions. Results of XRD on these samples were also listed in the table attached at the end.

Note that other milling conditions (i.e., with different polymer binders in different solvents by either recycle mode or pass mode) will result in CGM mill-bases with either gamma- or beta-form TiOPc.

2) Adding a different solvent to the CGM mill-base of gamma-form TiOPc

As shown by the third set of examples in Table-2 attached at the end that S-form TiOPc can also be obtained by adding THF to the CGM mill-base of gamma-form TiOPc that was prepared by milling with BX-5 in 11% of ethyl acetate for 8 hours.

It should be noted that adding THF to other CGM mill-base of gamma-form TiOPc may not always change the crystal form of TiOPc from gamma to S-form. As mentioned earlier, the amounts of solvents added to the CGM mill-bases for XRD tests were equivalent to the amount used in single layer OPC coating solutions. Results are shown below in the data and work contributing to Table 3.

3) Aging the CGM mill-bases of gamma-form TiOPc

As shown by the last three sets of examples in Table-2 below, S-form TiOPc can further be obtained by:

a. After aging in a refrigerator for one week (or less, although no XRD data available) for the CGM mill-bases of gamma-form TiOPc that were prepared by milling with polycarbonate-Z200 (ordered from Mitsubishi Engineering Plastics Corporation) in dioxane for 1 hr by using recycle mode or for 6 passes by using pass mode.

b. After aging at room temperature for three weeks (or less, although no XRD data available) the CGM mill-base that was prepared by milling with polycarbonate-Z200 in 22% of xylene for 4 passes by using pass mode.

It should be noted that the S-form TiOPc obtained by aging in a refrigerator for the CGM mill-base that was prepared by 6 passes of milling with polycarbonate-Z200 in dioxane was stable without showing any additional non-gamma peaks in XRD even after one month of storing in the refrigerator. While the S-form TiOPc obtained by aging in a refrigerator for the CGM mill-base that was prepared by 1 hour of milling with polycarbonate-Z200 showed up an additional non-gamma peak at 10.6 after 3 weeks of storing in a refrigerator.

It should also be noted heating the CGM mill-bases of gamma-form TiOPc may or may not change the crystal structures of TiOPc depending on the heating time and temperature on a specific CGM mill-base. Results and data on this preparation are shown in Table 4.

TABLE 1

Peak Areas in X-Ray Diffraction of TiOPc Powder

| Samples | Non-Gamma Peaks | | | Overlap-Peak | | Gamma-Peaks | | Peak Ratios | | |
|---|---|---|---|---|---|---|---|---|---|---|
| | S-10.6 | S-20.9 | S-26.4 | 9.7/9.4 | 27.4 | G-7.4 | G-11.8 | N26/Ot | N26/O9 | N26/O27 |
| Gamma(7) | 0 | 0 | 0 | 10476 | 4189 | 817 | 1918 | 0.00 | 0.00 | 0.00 |
| Beta-9 | 1991 | 7219 | 26244 | 6852 | 8060 | 0 | 0 | 1.76 | 3.83 | 3.26 |
| Beta-11 | 2817 | 1712 | 7098 | 6734 | 2269 | 0 | 0 | 0.79 | 1.05 | 3.13 |

FIG. 30 shows the visible absorption spectra of CGM samples obtained by milling the gamma-form TiOPc under three different milling conditions. The visible spectra of the milled sample whose XRD spectra was a) similar to the neat gamma-form TiOPc was designated as gamma, b) similar to neat beta-form TiOPc was designated as beta, and c) different from any neat TiOPc structure was designated as S-form TiOPc.

| Figure Label | Max. Peak Locations (+/− 10°) | | | | |
|---|---|---|---|---|---|
| Gamma | | | 790 | 710 | 630 |
| Beta | | 820 | 750 | 680 | 630 |
| S | 840 | 790 | 750 | 710 | 630 |

TABLE 2

Peak Areas in X-Ray Diffraction of CGM Mill-bases

| CGM Mill-Base | | Milling, Aging, or Treatment | Non-Gamma Peaks (2θ) | | | Overlap-Peak (2θ) | | Gamma-Peaks (2θ) | | Peak Ratios | | | |
|---|---|---|---|---|---|---|---|---|---|---|---|---|---|
| Solvent | Binder | | S-10.6° | S-20.9° | S-26.4° | 9.7°/9.4° | 27.4° | G-7.4° | G-11.8° | Nt/Gt | N26/Gt | N26/Ot | N26/O27 |
| 13% in MEK | BX-5 2.3:1 | 1 hr | 0 | 0 | 0 | 5158 | 3729 | 349 | 1115 | 0.00 | 0.00 | 0.00 | 0.00 |
| | | 4 hr | 0 | 0 | 0 | 3304 | 3769 | 230 | 776 | 0.00 | 0.00 | 0.00 | 0.00 |
| | | 6 hr | 0 | 0 | 147 | 2688 | 3346 | 206 | 942 | 0.13 | 0.13 | 0.02 | 0.04 |
| | | 8 hr | 0 | 0 | 232 | 2046 | 3441 | 83 | 755 | 0.28 | 0.28 | 0.04 | 0.07 |
| | | RF for 1 month | 0 | 0 | 175 | 1186 | 2394 | 10 | 354 | 0.48 | 0.48 | 0.05 | 0.07 |
| | | Add Dx to 8 hr-RF | 0 | 0 | 288 | 1804 | 2074 | 75 | 481 | 0.52 | 0.52 | 0.07 | 0.14 |
| | | Add THF to 8 hr-RF | 0 | 0 | 881 | 3164 | 8089 | 207 | 828 | 0.85 | 0.85 | 0.08 | 0.11 |
| 20% in MEK | BX-5 2.3:1 | 1 hr | 8 | 0 | 65 | 4110 | 4094 | 222 | 1275 | 0.05 | 0.04 | 0.01 | 0.02 |
| | | 2 hr | 0 | 0 | 323 | 2990 | 4480 | 215 | 821 | 0.31 | 0.31 | 0.04 | 0.07 |
| | | 4 hr | 0 | 0 | 1666 | 4138 | 8741 | 128 | 1301 | 1.17 | 1.17 | 0.13 | 0.19 |
| | | 6 hr | 0 | 73 | 1561 | 2189 | 5814 | 0 | 609 | 2.68 | 2.56 | 0.20 | 0.27 |
| | | 8 hr | 36 | 122 | 3075 | 1680 | 7790 | 0 | 648 | 4.93 | 4.75 | 0.32 | 0.39 |
| 11% in EA | BX-5 1:1 | 8 hr | 29 | 0 | 11.5 | | 3700 | 261 | 565 | 0.05 | 0.01 | 0.00 | 0.00 |
| | | Add THF to 8 hr-RT | 0 | 0 | 752 | 4206 | 10796 | 343 | 1439 | 0.42 | 0.42 | 0.05 | 0.07 |
| | | Add THF to 8 hr-RT | 0 | 0 | 621 | 2208 | 5919 | 65 | 685 | 0.83 | 0.83 | 0.08 | 0.10 |
| 19% in Dx | PCZ 1:1 | 1 hr | 0 | 0 | 0 | 3763 | 1309 | 308 | 380 | 0.00 | 0.00 | 0.00 | 0.00 |
| | | | 0 | 0 | 186 | 6506 | 2323 | 638 | 857 | 0.12 | 0.12 | 0.02 | 0.08 |
| | | | 138 | 0 | 153 | 3016 | 1026 | 277 | 307 | 8.42 | 0.26 | 0.04 | 0.15 |
| | | 2 hr | 342 | 99 | 372 | 3275 | 1137 | 164 | 234 | 2.04 | 0.93 | 0.08 | 0.33 |
| 15% in Dx | PCZ 1:1 | 1P | 0 | 0 | 0 | 2276 | 604 | 222 | 250 | 0.00 | 0.00 | 0.00 | 0.00 |
| | | 6P | 0 | 0 | 0 | 4361 | 1265 | 325 | 507 | 0.00 | 0.00 | 0.00 | 0.00 |
| | | 6P-RT for 1 week | 182 | 100 | 347 | 4516 | 1556 | 298 | 515 | 0.77 | 0.43 | 0.06 | 0.22 |
| | | 6P-RF for 1 week | 0 | 0 | 217 | 4624 | 1867 | 224 | 581 | 0.27 | 0.27 | 0.03 | 0.12 |
| | | 6P-RF for 1 month | 0 | 0 | 124 | 3077 | 756 | 172 | 376 | 0.23 | 0.23 | 0.03 | 0.16 |
| | | Add THF to 6P-RF | 0 | 0 | 50 | 1383 | 246 | 84 | 128 | 0.24 | 0.24 | 0.03 | 0.20 |
| 22% in Xy | PCZ 1:1 | 4P | 0 | 0 | 0 | 4760 | 1169 | 349 | 454 | 0 | 0 | 0 | 0 |
| | | 4P-RT for ~3 weeks | 0 | 0 | 134 | 6977 | 1583 | 528 | 627 | 0.12 | 0.12 | 0.02 | 0.08 |

Note:
1) The solvents used for millings were methyl ethyl ketone (MEK), ethyl acetate (EA), 1,4-dioxane (Dx), or xylene (Xy). They were all commercially obtained from Aldrich in Milwaukee, WI.
2) The polymer binders used for milling were polyvinyl butyral (BX-5, commercially obtained from Sekisui Chemical Co. Ltd., Japan), or polycarbonate-Z200 (commercially obtained from Mitsubishi Engineering-Plastics Corporation, White Plains, NY).
3) The pigment to binder ratio for each CGM mill-base was indicated under the column for binders.

C. TiOPc in CGM Milled by Recycle-Mode

Gamma-TiOPc was obtained from H. W. Sands for the CGM milling by recycle-mode. It was milled with different polymer binders (i.e., PC-Z, BX-1, or BX-5) at different TiOPc/binder ratios and in different solvents (i.e., 1,4-dioxane, p-xylene, THF, MEK, and ethyl acetate). Listed in Table-3 on next page are data for different CGM mill-bases by recycle-mode along with peak areas from X-ray diffraction at the scanning angles of 7.4, 10.6, 11.8, 20.9, 26.4, and 27.4.

It should be noted that peaks at 7.4, 11.8, and 27.4 are observed in gamma-TiOPc as listed in Table-1 and as shown in FIG. 2 while peaks at 10.6, 20.9, and 26.4 were not observed in FIG. 2 for gamma-TiOPc, but were observed in FIG. 2 for beta-TiOPc. It should also be noted that the peak at 27.4 was an overlapped peak that was observed in both gamma-TiOPc and beta-TiOPc.

Plots of X-ray diffraction for the different CGM mill-bases by recycle-mode that were listed in Table-3 are available upon request (they cannot be attached to this report due to the size of the data files).

TABLE 3

CGM Milled by Recycle Mode

| CGM Mill-Base | | Milling | Ageing or | Non-Gamma Peaks (2θ) | | | M-Peak | Gamma-Peaks | | Peak Ratios | | |
|---|---|---|---|---|---|---|---|---|---|---|---|---|
| Solvent | Binder | hr | Treatment | 10.6° | 20.9° | 26.4° | 27.4° | G- 7.4° | G- 11.8° | Nt/Gt | N26/ Gt | N26/ P27 |
| 21%-Dx | PCZ | 10 | RT-60D | 1130 | 769 | 5011 | 1005 | 0 | 0 | S Only | | 4.99 |
| 14%-Dx | 2:1 | | RT-45D | 1587 | 873 | 4514 | 992 | 0 | 0 | S Only | | 4.55 |
| 19% in | PCZ 1:1 | 1 | RF-1D | 0 | 0 | 0 | 1309 | 308 | 380 | 0.00 | 0.00 | G only |
| Dioxane | | 2 | RF-1D | 342 | 99 | 372 | 1137 | 164 | 234 | 2.04 | 0.93 | 0.33 |
| | | 3 | RF-1D | 825 | 416 | 1642 | 1041 | 63 | 101 | 17.58 | 10.01 | 1.58 |
| | | 4 | RF-1D | 1299 | 746 | 3057 | 737 | 21 | 40 | 83.64 | 50.11 | 4.15 |
| 18% in | PCZ 1:1 | 1 | RT-6D | 0 | 0 | 0 | 1302 | 468 | 609 | 0.00 | 0.00 | G only |
| Xylene | | 2 | RT-6D | 176 | 136 | 888 | 1853 | 406 | 388 | 1.51 | 1.12 | 0.48 |
| | | 3.5 | RT-7D | 397 | 133 | 1450 | 1601 | 192 | 289 | 4.12 | 3.01 | 0.91 |
| | | 3.5 | RT-19D | 508 | 620 | 3421 | 1686 | 136 | 247 | 11.88 | 8.93 | 2.03 |
| 27% in | PCZ 1:1 | 1 | RF-4D | 0 | 0 | 0 | 1385 | 356 | 540 | 0.00 | 0.00 | G only |
| Xylene | | 2 | RF-4D | 0 | 0 | 0 | 664 | 167 | 267 | 0.00 | 0.00 | G only |
| | | 3 | RF-4D | 536 | 155 | 1092 | 997 | 152 | 88 | 7.43 | 4.55 | 1.10 |
| | | 3.5 | RF-5D | 727 | 262 | 2222 | 1256 | 229 | 93 | 9.97 | 6.90 | 1.77 |
| 15%-THF | PCZ 1:1 | 8 | RT-160D | 1142 | 501 | 2078 | 607 | 0 | 0 | S Only | | 3.42 |
| 20% in THF | | 1 | RF-1D | 585 | 328 | 2135 | 1148 | 64 | 65 | 23.63 | 16.55 | 1.86 |
| | | 2 | RF-1D | 801 | 680 | 2304 | 739 | 10 | 56 | 57.35 | 34.91 | 3.12 |
| | | 3 | RF-1D | 1571 | 854 | 3811 | 832 | 0 | 0 | S Only | | 4.58 |
| | | 4 | RF-1D | 1370 | 740 | 3912 | 850 | 0 | 0 | S Only | | 4.60 |
| | | 5 | RF-1D | 1069 | 589 | 2732 | 584 | 0 | 0 | S Only | | 4.68 |
| 12% MEK | BX1-2:1 | 8 | RT-210D | 39 | 31 | 684 | 3805 | 218 | 962 | 0.64 | 0.58 | 0.18 |
| 13% in MEK | BX-5 | 1 | RF-1D | 0 | 0 | 0 | 3729 | 349 | 1115 | 0.00 | 0.00 | G only |
| | 2.3:1 | 2 | RF-6D | 0 | 0 | 0 | 2854 | 203 | 803 | 0.00 | 0.00 | 0.00 |
| | | 4 | RF-6D | 0 | 0 | 0 | 3769 | 230 | 776 | 0.00 | 0.00 | 0.00 |
| | | 6 | RF-6D | 0 | 0 | 147 | 3346 | 206 | 942 | 0.13 | 0.13 | 0.04 |
| | | 8 | RF-1D | 0 | 0 | 232 | 3441 | 83 | 755 | 0.28 | 0.28 | 0.07 |
| 4%-EA | BX1-2.1 | 8 | RT-120D | 0 | 0 | 40 | 5915 | 255 | 984 | 0.03 | 0.03 | 0.01 |
| 11%-EA | BX-5 1:1 | 8 | RT-68D | 29 | 0 | 11.5 | 3700 | 261 | 565 | 0.05 | 0.01 | 0.00 |
| | | | Add Dx | 0 | 0 | 0 | 1649 | 113 | 476 | 0.00 | 0.00 | 0.00 |
| | | | Add Xy | 0 | 0 | 0 | 1573 | 188 | 503 | 0.00 | 0.00 | 0.00 |
| | | | Add THF | 0 | 0 | 752 | 10796 | 343 | 1439 | 0.42 | 0.42 | 0.07 |

Note:
1) The solvents used for millings were methyl ethyl ketone (MEK), ethyl acetate (EA), 1,4-dioxane (Dx), xylene (Xy), or THF. They were all commercially obtained from Aldrich in Milwaukee, WI.
2) The polymer binders used for milling were polyvinyl butyral (BX-1 or -5, commercially obtained from Sekisui Chemical Co. Ltd., Japan) or polycarbonate-Z200 (commercially obtained from Mitsubishi Engineering-Plastics Corporation, White Plains, NY).
3) The pigment to binder ratio for each CGM mill-base was indicated under the column for binders.
4) Under the column of "Aging or Treatments":
a) "-RT" or "-RF" indicates the mill-base was aged at room temperature or in a refrigerator.
b) Numbers in front of "D" indicates the number of days that a CGM mill-base was aged before testing.
5) Under the column for "Peak Ratios":
a) Nt/Gt is the ratio of total peak areas for non-gamma peaks at (10.6 + 20.9 + 26.4) vs. total of gamma-peaks at (7.4 + 11.8).
b) N26/Gt is the ratio of peak areas for non-gamma peak at 26.4 vs. total of gamma-peaks at (7.4 + 11.8).
c) N26/P27 is the ratio of peak areas for non-gamma peak at 26.4 vs. the overlapped peak at 27.4.
6) For those values of peak areas lower than 50, the peak intensities may be related to the noise from the background.

Discussions and Conclusions:

a) Pure gamma peaks were observed in the freshly milled CGM samples that were milled by recycle-mode with PC-Z in dioxane for less than 1 hr. or in p-xylene for less than 2 hr. as well as those milled with BX-5 in MEK for less than 4 hr. or with either BX-1 or BX-5 in ethyl acetate for up to 8 hr., indicating that TiOPc remained in pure gamma-form crystals in these samples.

b) Both gamma peaks and non-gamma peaks were observed in freshly milled CGM samples that were milled with PC-Z in THF for less than 2 hr., or in dioxane for more than 1 hr., or in p-xylene for more than 2 hr., indicating that the crystal structure of the gamma-TiOPc has been changed from pure gamma-form to non-gamma form which is believed to be the results of new crystal forms and/or mixture of different crystal forms in a single lattice (ca. gamma, beta, and/or new crystal lattice forms), but as single crystals with varying lattice structure, not as distinct crystal particles of different crystal forms.

c) All the non-gamma peaks listed in the table were observed in freshly milled CGM samples that were milled with PC-Z in THF for more than 3 hr. The completely disappearance of the gamma peaks indicating that the crystal structure of all the gamma-TiOPc has been converted to beta-TiOPc.

d) When gamma-TiOPc was milled with BX-5 in MEK, the freshly milled sample showed only one non-gamma peak at 26.4 after 6 hr of milling. Increasing milling time from 6 hr. to 8 hr. resulted in the increase of the peak at 26.4 (as shown by the ratios of peak areas) while the other non-gamma peaks remained absent. This indicates that a new crystal form may have been formed which is neither a gamma-form nor a beta-form crystal, as the single crystal form (the S-form) had both beta and gamma peaks.

e) Adding THF to a CGM mill-base of which TiOPC remained in gamma-form crystal (i.e., CGM milled with polyvinyl butyral BX-5 in ethyl acetate for 8 hr.) also resulted in the appearance of one non-gamma peak at 26.4, indicating the formation of the new crystal form as discussed above for TiOPc milled with BX-5 in MEK for more than 6 hours.

f) Adding dioxane or p-xylene to a CGM mill-base of which TiOPc remained in gamma-form crystal (i.e., CGM milled with BX-5 in ethyl acetate for 8 hr.), however, did not result in any non-gamma peaks, indicating no changes in crystal structures of the gamma-TiOPc.

g) Aging at room temperature for the CGM after 3.5 hr. milling with PC-Z in p-xylene resulted in the growth of non-gamma peaks. This is observed in the ratio of peak areas between total non-gamma peaks and gamma-peaks (i.e., Nt'/Gt) that was increased from 1.10 to 2.95 when tested over a twelve day period, the data shown chronologically, from earlier to later.

h) Aging at room temperature for the CGM after 8 hr. milling with BX-5 in MEK resulted in the appearance of additional non-gamma peaks, indicating that the new crystal form associated with one non-gamma peak at 26.4 was not stable in this CGM mill-base at room temperature.

D. TiOPc in CGM Milled by Pass-Mode

Gamma-TiOPc ordered from Sand for the CGM milling by pass-mode. It was milled with different polymer binders (i.e., PC-Z or BX-5) at different TiOPc/binder ratios and in different solvents (i.e., 1,4-dioxane, p-xylene, THF, and MEK). Listed below in Table-4 are data for different CGM mill-bases along with peak areas from X-ray diffraction at the scanning angles of 7.4, 10.6, 11.8, 20.9, 26.4, and 27.4. Details of these peaks are similar to those discussed in section C, above) for TiOPC in CGM milled by recycle-mode.

Plots of X-ray diffraction for the CGM milled by pass-mode that were listed in Table-4 are available upon request (they cannot be attached to this report due to the size of the data files).

TABLE 4

CGM Milled by Pass-Mode

| CGM Mill-Base | | Milling passes | Ageing or Treatment | Non-Gamma Peaks (2θ) | | | O-Peak (2θ) | Gamma-Peaks (2θ) | | Peak Ratios | | |
|---|---|---|---|---|---|---|---|---|---|---|---|---|
| Solvent | Binder | | | 10.6° | 20.9° | 26.4° | 27.4° | 7.4° | 11.8° | Nt/Gt | N26/Gt | N26/N27 |
| 15% in Dioxane | PCZ 1:1 | 1 | RF-5D | 0 | 0 | 0 | 604 | 222 | 250 | Gamma only | | |
| | | | RF-5D | 0 | 0 | 0 | 520 | 162 | 260 | | | |
| | | 6 | RF-5D | 0 | 0 | 0 | 1265 | 325 | 507 | | | |
| | | | 6P, RT-1 wk | 182 | 100 | 347 | 1556 | 298 | 515 | 0.77 | 0.43 | 0.22 |
| | | | 6P, 50 C.-20 hr | 567 | 531 | 2422 | 491 | 0 | 0 | Non-Gamma only | | 4.93 |
| | | | 6P, 110 C.-1 hr | 0 | 0 | 30 | 1002 | 236 | 298 | 0.06 | 0.06 | 0.03 |
| | Pigment Dispersed in 10% Dx, 50 C.-20 hr | | | 0 | 0 | 0 | 3286 | 764 | 990 | G only | | |
| 22% in p-Xy | PCZ 1:1 | 3 | RT-6D | 0 | 0 | 0 | 1152 | 422 | 504 | Gamma only | | |
| | | 4 | RT-6D | 0 | 0 | 0 | 1169 | 349 | 454 | | | |
| | | | 4P, RT-2 wk | 0 | 0 | 0 | 972 | 430 | 444 | | | |
| 23% in p-Xy | PCZ 1:1 | 1 | RF-5D | 0 | 0 | 0 | 1719 | 483 | 653 | | | |
| | | 8 | RF-2D | 0 | 0 | 0 | 1022 | 319 | 402 | | | |
| | | 8 | RF-2D | 0 | 0 | 0 | 1302 | 285 | 438 | | | |
| | | | 8P, 50 C.-20 hr | 0 | 0 | 0 | 1042 | 396 | 325 | | | |
| | | | 8P, 110 C.-1 hr | 0 | 0 | 0 | 955 | 226 | 395 | | | |
| | | | 8P film, 50 C.-1 hr | 0 | 0 | 0 | 1147 | 368 | 468 | | | |

TABLE 4-continued

CGM Milled by Pass-Mode

| CGM Mill-Base | | Milling passes | Ageing or Treatment | Non-Gamma Peaks (2θ) | | | O-Peak (2θ) | Gamma-Peaks (2θ) | | Peak Ratios | | |
|---|---|---|---|---|---|---|---|---|---|---|---|---|
| Solvent | Binder | | | 10.6° | 20.9° | 26.4° | 27.4° | 7.4° | 11.8° | Nt/Gt | N26/ Gt | N26/ N27 |
| Pigment Dispersed in 10% Xy, 50 C.-20 hr | | | | 0 | 0 | 0 | 2501 | 349 | 677 | | | |
| 20% in THF | PCZ 1:1 | 1 | RF-1D | 0 | 0 | 0 | 1022 | 517 | 426 | | G only | |
| | | 8 | RF-1D | 1004 | 404 | 2110 | 1321 | 137 | 124 | 13.48 | 8.08 | 1.60 |
| 12% in MEK | BX-5 | 1 | RF-3D | 0 | 0 | 0 | 1897 | 266 | 766 | | Gamma only | |
| | 2.3:1 | 4 | RF-3D | 0 | 0 | 0 | 1733 | 327 | 614 | | | |
| | | 5 | RF-3D | 0 | 0 | 0 | 2310 | 316 | 821 | | | |
| | | 8 | RF-3D | 0 | 0 | 0 | 1963 | 256 | 637 | | | |

Note:
1) The solvents used for millings were methyl ethyl ketone (MEK), ethyl acetate (EA), 1,4-dioxane (Dx), xylene (Xy), or THF. They were all commercially obtained from Aldrich in Milwaukee, WI.
2) The polymer binders used for milling were polyvinyl butyral (BX-1 or -5, commercially obtained from Sekisui Chemical Co. Ltd., Japan) or polycarbonate-Z200 (commercially obtained from Mitsubishi Engineering-Plastics Corporation, White Plains, NY).
3) The pigment to binder ratio for each CGM mill-base was indicated under the column for binders.
4) Under the column of "Aging or Treatments":
a) "-RT" or "-RF" indicates the mill-base was aged at room temperature or in a refrigerator.
b) Numbers in front of "D" indicates the number of days that a CGM mill-base was aged before testing.
5) Under the column for "Peak Ratios":
a) Nt/Gt is the ratio of total peak areas for non-gamma peaks at (10.6 + 20.9 + 26.4) vs. total of gamma-peaks at (7.4 + 11.8).
b) N26/Gt is the ratio of peak areas for non-gamma peak at 26.4 vs. total of gamma-peaks at (7.4 + 11.8).
c) N26/P27 is the ratio of peak areas for non-gamma peak at 26.4 vs. the overlapped peak at 27.4.
6) For those values of peak areas lower than 50, the peak intensities may be related to the noise from the background.

Discussions and Conclusions:
a) Pure gamma peaks were observed in the freshly milled CGM samples that were milled by pass-mode with PC-Z in dioxane or in p-xylene as well as the one with BX-5 in MEK, indicating that TiOPc remained in pure gamma-form crystals in these samples.

b) Milling in THF with PC-Z after 1 pass showed only gamma peaks, but after 8 passes, the product resulted in both gamma peaks and non-gamma peaks (note that no samples were tested between 2 and 7 passes). This indicates that after 8 passes of milling, the crystal structure of the gamma-TiOPc has been changed from pure gamma-form to non-gamma form which is believed to be the results of new crystal forms and/or mixture of different crystal forms (ca. gamma, beta, and/or new crystal forms), again with the composite lattice structure within each crystal, not separate crystals with gamma and beta structures.

c) One week of aging at room temperature for the gamma-form CGM sample that was milled with PC-Z in dioxane after 8 passes resulted in the appearance of other non-gamma peaks, indicating that the crystal structure of the gamma-TiOPc has been changed from pure gamma-form to non-gamma form which could be the results of new crystal forms and/or mixture of different crystal forms (ca. gamma, beta, and/or new crystal forms), again with the composite lattice structure within each crystal, not separate crystals with gamma and beta structures.

d) Heating at 50° C. for 20 hr. for the gamma-form CGM sample that was milled with PC-Z in dioxane after 8 passes resulted in the appearance of other non-gamma peaks and disappearance of gamma peaks, indicating that the crystal structure of the gamma-TiOPc has been changed from pure gamma-form to pure beta-form.

e) Heating at 110° C. for 1 hr. for the gamma-form CGM sample that was milled with PC-Z in dioxane after 8 passes resulted in the appearance of a very small non-gamma peak at 26.4, indicating the formation of very small amount of non-gamma-form crystals and lattice structure. However, due to the small size of the peak, it could be some noise from the background (although it looked more like a small peak).

f) For the gamma-form CGM sample that was milled with PC-Z in p-xylene after 8 passes, heating at 50° C. for 20 hr. or at 110° C. for 1 hr. did not result in any non-gamma peaks. The same CGM system after 4 passes of milling also showed no change after aging at room temperature for 2 weeks. These indicate that the crystal structure of gamma-TiOPc was very stable in the CGM mill-base that was milled with PC-Z in p-xylene by pass-mode.

g) Finally, dispersing gamma-TiOPc in either dioxane or p-xylene followed by heating at 50° C. for 20 hr. did not show any non-gamma peaks, indicating that heating the gamma-TiOPc in a solvent without any polymer binder did not change its crystal structure.

B) Evaluation of Single Layer OPC with TiOPc of Different Crystal Forms

In general, coatings with beta-form TiOPc showed poor electrostatic results (high discharge voltage and poor electrostatic sensitivity) while coatings with either gamma- or S-form TiOPc showed good electrostatic behavior (low discharge voltage and good electrostatic sensitivity).

TABLE 5

Peak Areas in X-Ray Diffraction on CGM Mill-bases

| CGM Millbase Samples | CGM Mill-Base Solvent | Binder | Milling Time | Intensity (a.u.) at X-ray Scanning Angles (2θ) | | | | | | |
|---|---|---|---|---|---|---|---|---|---|---|
| | | | | 7.4° | 9.7° | 10.6° | 11.8° | 20.9° | 26.4° | 27.4° |
| MB-Ex-1 | 12% MEK | BX-5 2.3:1 | 8 Passes | 256 | 3135 | 0 | 637 | 0 | 0 | 1963 |
| MB-Ex-2 | 13% MEK | BX-5 2.3:1 | 8 hr. | 20 | 1329 | 0 | 459 | 0 | 236 | 2557 |
| MB-Ex-3 | 15% THF | PCZ 1:1 | 8 hr. | 0 | 0 | 1142 | 0 | 501 | 2078 | 607 |

Note:
1) CGM in Ex-1 was TiOPc milled with BX-5 at 2.3:1 in 12% MEK after 8 passes of milling using pass mode.
2) CGM in Ex-2 was TiOPc milled with BX-5 at 2.3:1 in 13% MEK after 8 hours of milling using recycle mode.
3) CGM in Ex-3 was TiOPc milled with polycarbonate-Z200 in 15% THF after 8 hours of milling using pass mode.
4) BX-5 was a polyvinyl butyral resin that was commercially obtained from Sekisui Chemical Co. Ltd., Japan.
5) Polycarbonate-Z200 was commercially obtained from Mitsubishi Engineering-Plastics Corporation, White Plains, NY.

TABLE 6

Electrostatic Results of Single Layer OPC after 100 cycles

| | Prodstart | | | | | | Changes | | |
|---|---|---|---|---|---|---|---|---|---|
| Examples | Vac | Vdis | Contrast | E1/2 | Vdk | Vres | ΔVac | ΔVdis | ΔVres |
| Ex-1 | 593 | 38 | 555 | 0.07 | 52 | 18 | −50 | 2 | 3 |
| Ex-2 | 560 | 28 | 532 | 0.08 | 48 | 9 | −11 | −3 | −1 |
| Ex-3 | 643 | 177 | 466 | 0.45 | 46 | 75 | 37 | 74 | 13 |

Figure 31:
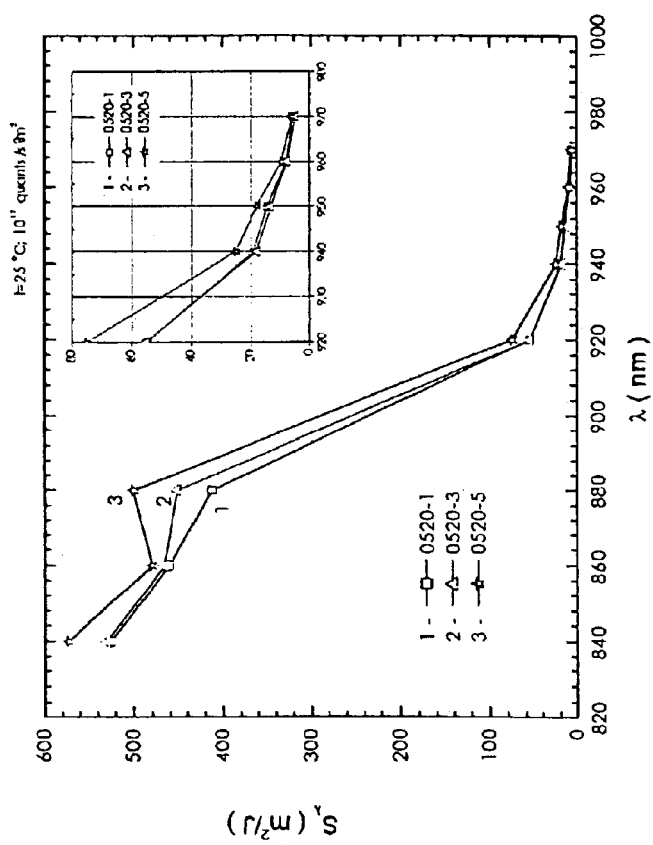
FIG. 31 shows the photosensitivity of three different single layer photoreceptor compositions was measured in the long wavelength region. Sample 0520-1 formulation contained TiOPc pigment without any TM additives; sample 0520-3 formulation contained TiOPc pigment with 20% of ETM17; and sample 0520-5 formulation contained TiOPc pigment with 20% of ETM17 and 20% of MPCT 10.

Note:
1) Ex-1, -2, and -3 were single layer OPC that were formulated with CGM of gamma, S, and beta-form TiOPc, respectively.
2) Coating formulations for the three examples were TiOPc/ETM-17/MPCT-10/binder at 6.5/8.5/32/50.
3) TiOPc was commercially obtained from H. W. Sands Corp., Jupiter, FL;
4) ETM-17 was an electron transport material and was synthesized in the lab;
5) MPCT-10 was a charge transport material and was commercially obtained from Mitsubishi Paper Mills, Tokyo, Japan;
6) Binders used in coatings were polyvinyl butyral resins (BX-1 and BX-5) and were commercially obtained from Sekisui Chemical Co. Ltd., Japan In FIG. 31, showing charge transfer complex formation, the photosensitivity of three different single layer photoreceptor compositions was measured in the long wavelength region. Sample 0520-1 formulation contained TiOPc pigment without any transport material additives; sample 0520-3 formulation contained TiOPc pigment with 20% of ETM17; and sample 0520-5 formulation contained TiOPc pigment with 20% of ETM17 and 20% of MPCT 10. In the following figures, a small difference in sensitivity was observed in the region above 900 nm. These differences can be attributed to the charge transfer complexes of transfer materials with TiOPc, because the charge transfer complex between transfer materials alone absorbs light and its photosensitive falls in the short wavelength region. Note: The differences are very small and near the measurement accuracy.

Figure 32:
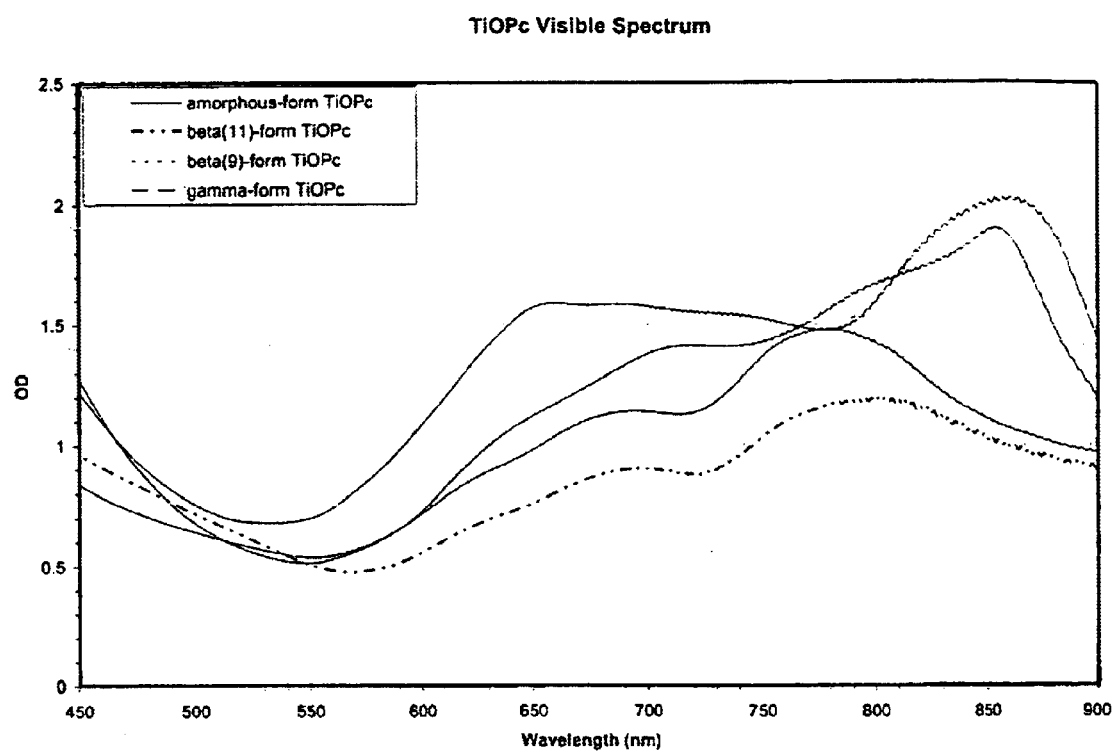
FIG. 32 shows the visible spectra of four different forms of neat, commercial TiOPc: amorphous, beta (9) beta (11), and gamma forms.

Note:
1) ETM17 is (4-n-butoxycarbonyl-9-fluorenylidene) malononitrile made as described in U.S. Pat. No. 4,559,287.
2) MPCT-10 is a commercial charge transport material obtained from Mitsubishi Paper, catalogue ID as MPCT-10.
3) TM is short for transport material FIG. 32 shows the visible absorption spectra of commercially available amorphous-, beta 9-, beta 11- and gamma-forms of TiOPc. These samples were prepared by dispersing the pigment in polycarbonate binder (no milling) and coating the samples as thin films on clear polyester film.

| Figure Label | Max. Peak Locations (+/−10°) | | | | | | |
|---|---|---|---|---|---|---|---|
| Amorphous | 860 | | 740 | | | 690 | 650 |
| Beta (9) | | | 780 | | | 690 | 630 |
| Beta (11) | | 800 | | | 700 | | 630 |
| Gamma | 850 | 800 | | 720 | | | 630 |

What is claimed:

1. A photoreceptor for electrophotography comprising a titanyl oxyphthalocyanine compound which has major peaks in terms of Bragg's 2theta angle to the CuK-α characteristic X-ray wavelength at 1.541 Angstroms at least at 9.5±0.2 degrees, 11.7±0.2 degrees, 15.0±0.2 degrees, 23.5±0.2 degrees, 24.1±0.2 degrees, 26.4±0.2 and 27.3.+−.0.2 degrees.

2. A photoreceptor for electrophotography comprising a titanyl oxyphthalocyanine compound which has major peaks in terms of Bragg's 2theta angle to the CuK-α characteristic X-ray wavelength at 1.541 Angstroms at least at 9.5±0.2 degrees, 9.7±0.2 degrees, 11.7±0.2 degrees, 13.5±0.2 degrees, 24.1±0.2 degrees, 26.4±0.2 degrees, and 27.3±0.2 degrees.

3. A photoreceptor for electrophotography comprising an electroconductive support and, provided thereon, a photosensitive layer containing a titanyl oxyphthalocyanine compound which has the major peaks of the titanyl oxyphthalocyanine of claim 1.

4. A photoreceptor for electrophotography comprising an electroconductive support and, provided thereon, a photosensitive layer containing a titanyl oxyphthalocyanine compound which has the major peaks of the titanyl phthalocyanine of claim 2.

5. A method for forming an S-form of titanyl oxyphthalocyanine comprising milling gamma-form titanyl oxyphthalocyanine in a solvent for sufficient time in a binder and with a solvent for the binder to add titanyl oxyphthalocyanine beta-form major peaks into crystalline lattice structure of the gamma-form titanyl oxyphthalocyanine.

6. The method of claim 5 wherein the binder comprises a polymer selected from the group consisting of polycarbonate resins and polyvinyl resins.

7. The method of claim 6 wherein the polymer is selected from the group consisting of polycarbonate A, polycarbonate Z, polyvinyl butyral and polyvinyl acetate.

8. The method of claim 5 wherein the solvent comprises a non-polar organic solvent.

9. The method of claim 5 wherein the solvent comprises a polar organic solvent.

10. The method of claim 5 wherein the solvent is selected from the group consisting of tetrahydrofuran, p-xylene and dioxane.

11. The method of claim 6 wherein the solvent is selected from the group consisting of tetrahydrofuran, p-xylene, methylethylketone, ethyl acetate, and dioxane.

12. The method of claim 7 wherein the solvent is selected from the group consisting of tetrahydrofuran, p-xylene, methylethylketone, ethyl acetate, and dioxane.

13. The method of claim 5 wherein milling is performed in a recycle mode.

14. The method of claim 5 wherein milling is performed in the pass mode.

15. The method of claim 6 wherein milling is performed in a recycle mode.

16. The method of claim 6 wherein milling is performed in the pass mode.

17. The method of claim 7 wherein milling is performed in a recycle mode.

18. The method of claim 10 wherein milling is performed in a recycle mode.

19. The method of claim 12 wherein milling is performed in the pass mode.

20. A method for forming an S-form of titanyl oxyphthalocyanine comprising milling gamma-form titanyl oxyphthalocyanine for sufficient time in a binder and with a solvent for the binder to add titanyl oxyphthalocyanine beta-form major peaks into crystalline lattice structure of the gamma-form titanyl oxyphthalocyanine wherein the binder comprises a polymer selected from the group consisting of polycarbonate resins and polyvinyl resins and wherein a resulting form of titanyl oxyphthalocyanine has major peaks in terms of Bragg's 2theta angle to the CuK-α characteristic X-ray wavelength at 1.541 Angstroms in combinations selected from the group consisting of:

a) at least at 9.5±0.2 degrees, 11.7±0.2 degrees, 15.0±0.2 degrees, 23.5±0.2 degrees, 24.1±0.2 degrees, 26.4±0.2 and 27.3.+−.0.2 degrees; and b) at least at 9.5±0.2 degrees, 9.7±0.2 degrees, 11.7±0.2 degrees, 13.5±0.2 degrees, 24.1±0.2 degrees, 26.4±0.2 degrees, and 27.3±0.2 degrees.

21. The method of claim 20 wherein the polymer is selected from the group consisting of polycarbonate A, polycarbonate Z, polyvinyl butyral and polyvinyl acetate.

22. The method of claim 5 wherein after milling, resulting titanyl oxyphthalocyanine is heated between 30–100° C. in a solvent to promote formation of S-form titanyl oxyphthalocyanine.

23. The method of claim 6 wherein after milling, resulting titanyl oxyphthalocyanine is heated between 30–100° C. in a solvent to promote formation of S-form titanyl oxyphthalocyanine.

24. A method for forming an S-form of titanyl oxyphthalocyanine comprising milling gamma-form titanyl oxyphthalocyanine for sufficient time in a binder and with a solvent for the binder to add titanyl oxyphthalocyanine beta-form major peaks into crystalline lattice structure of the gamma-form titanyl oxyphthalocyanine, wherein after milling, resulting titanyl oxyphthalocyanine is heated between 30–100° C. in a solvent to promote formation of S-form titanyl oxyphthalocyanine and wherein a resulting form of titanyl oxyphthalocyanine has major peaks in terms of Bragg's 2theta angle to the CuK-α characteristic X-ray wavelength at 1.541 Angstroms in combinations selected from the group consisting of: a) at least at 9.5±0.2 degrees, 11.7±0.2 degrees, 15.0±0.2 degrees, 24.1±0.2 degrees, 26.4±0.2 and 27.3.+−.0.2 degrees; and b) at least at 9.5±0.2 degrees, 9.7±0.2 degrees, 11.7±0.2 degrees, 13.5±0.2 degrees, 23.5±0.2 degrees, 24.1±0.2 degrees, 26.4±0.2 degrees, and 27.3±0.2 degrees.

25. A method for forming an S-form of titanyl oxyphthalocyanine comprising milling gamma-form titanyl oxyphthalocyanine for sufficient time in a binder and with a solvent for the binder to add titanyl oxyphthalocyanine beta-form major peaks into crystalline lattice structure of the gamma-form titanyl oxyphthalocyanine, after milling, resulting titanyl oxyphthalocyanine is heated between 30–100° C. in a solvent to promote formation of S-form titanyl oxyphthalocyanine, and wherein the binder comprises a polymer selected from the group consisting of polycarbonate resins and polyvinyl resins and wherein a resulting form of titanyl oxyphthalocyanine has major peaks in terms of Bragg's 2theta angle to the CuK-α characteristic X-ray wavelength at 1.541 Angstroms in combinations selected from the group consisting of:

a) at least at 9.5±0.2 degrees, 11.7±0.2 degrees, 15.0±0.2 degrees, 24.1±0.2 degrees, 26.4±0.2 and 27.3.+−.0.2 degrees; and b) at least at 9.5±0.2 degrees, 9.7±0.2 degrees, 11.7±0.2 degrees, 13.5±0.2 degrees, 23.5±0.2 degrees, 24.1±0.2 degrees, 26.4±0.2 degrees, and 27.3±0.2 degrees.

26. The photoreceptor of claim 1 comprising an electron transport material in combination with the titanyl oxyphthalocyanine compound.

27. The photoreceptor of claim 26 wherein the electron transport material comprises (4-n-butoxycarbonyl-9-fluorenylidene)malononitrile.

28. The photoreceptor of claim 1 comprising a charge transfer complex comprising the titanyl oxyphthalocyanine compound and a charge transport material.

29. The photoreceptor of claim 28 wherein the charge transport material comprises an enamine-stylbene.

* * * * *